Oct. 29, 1940.  J. W. BRYCE ET AL  2,219,737
CALCULATING MACHINE
Filed June 9, 1937   14 Sheets-Sheet 1

James W. Bryce
Arthur H. Dickinson
INVENTORS

BY
Cooper, Kerr & Dunham
ATTORNEYS

Oct. 29, 1940. J. W. BRYCE ET AL 2,219,737
CALCULATING MACHINE
Filed June 9, 1937 14 Sheets-Sheet 2
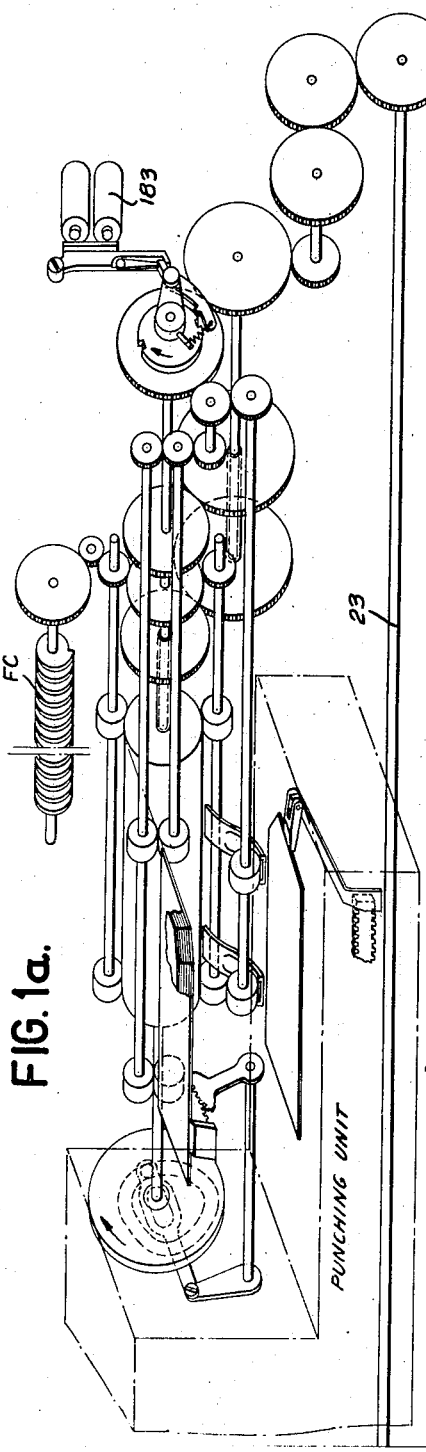
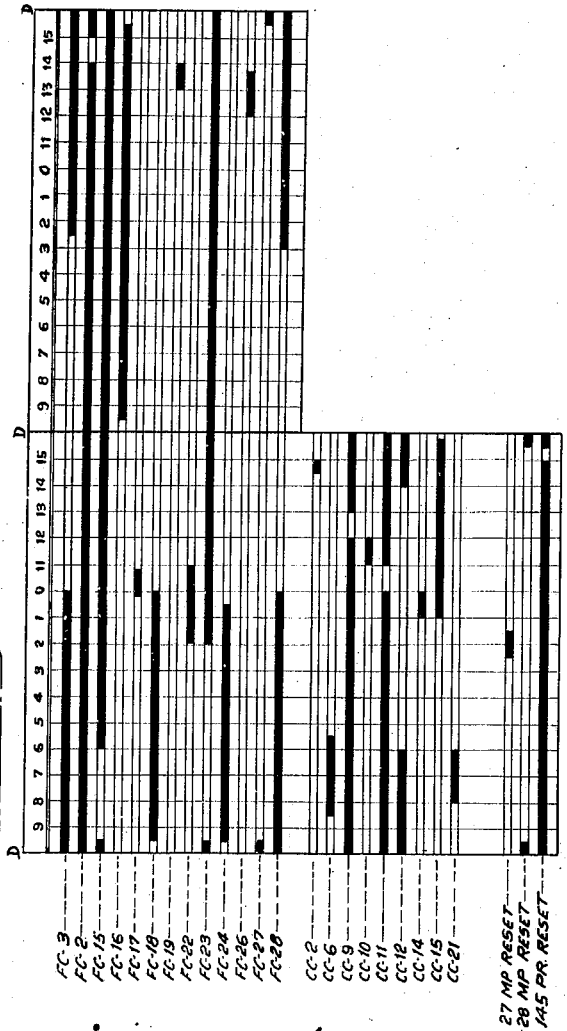
James W. Bryce
Arthur H. Dickinson
INVENTORS
BY
Cooper, Kerr & Dunham
ATTORNEYS

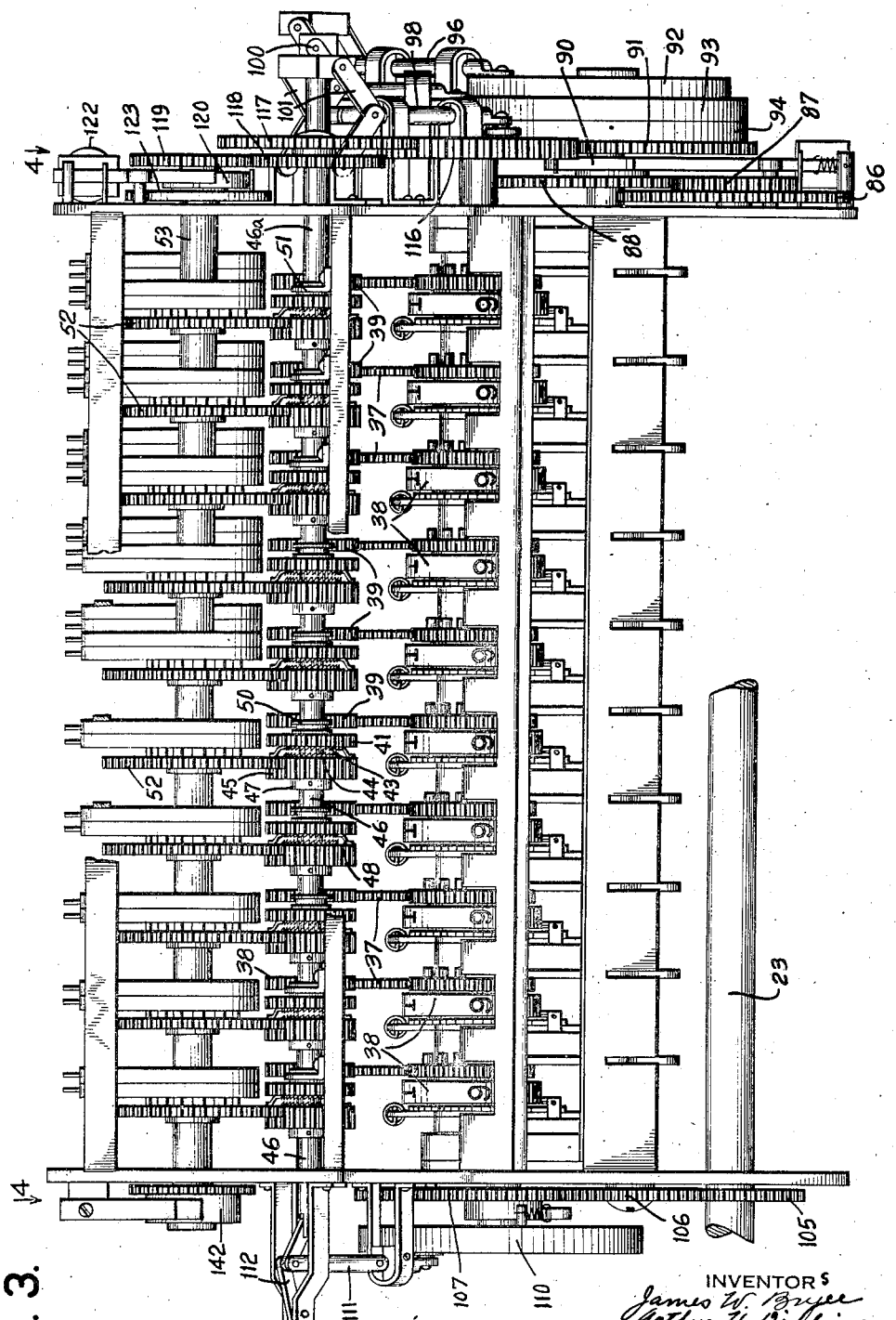

Oct. 29, 1940.    J. W. BRYCE ET AL    2,219,737
CALCULATING MACHINE
Filed June 9, 1937    14 Sheets-Sheet 4

Oct. 29, 1940.  J. W. BRYCE ET AL  2,219,737
CALCULATING MACHINE
Filed June 9, 1937   14 Sheets-Sheet 8
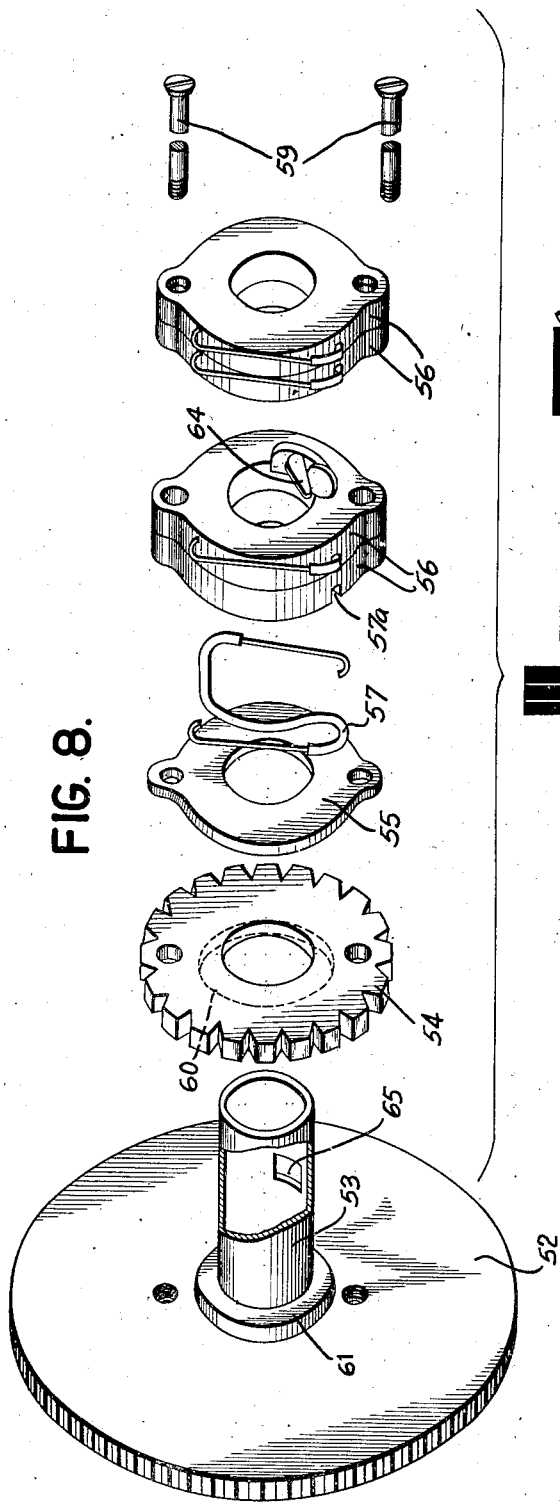
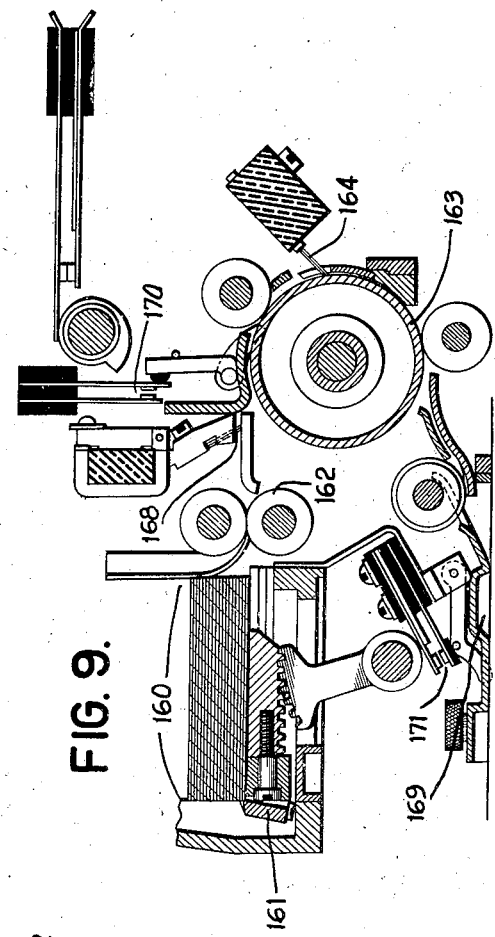
James W. Bryce
Arthur H. Dickinson
INVENTORS
BY
Cooper, Kerr & Dunham
ATTORNEYS

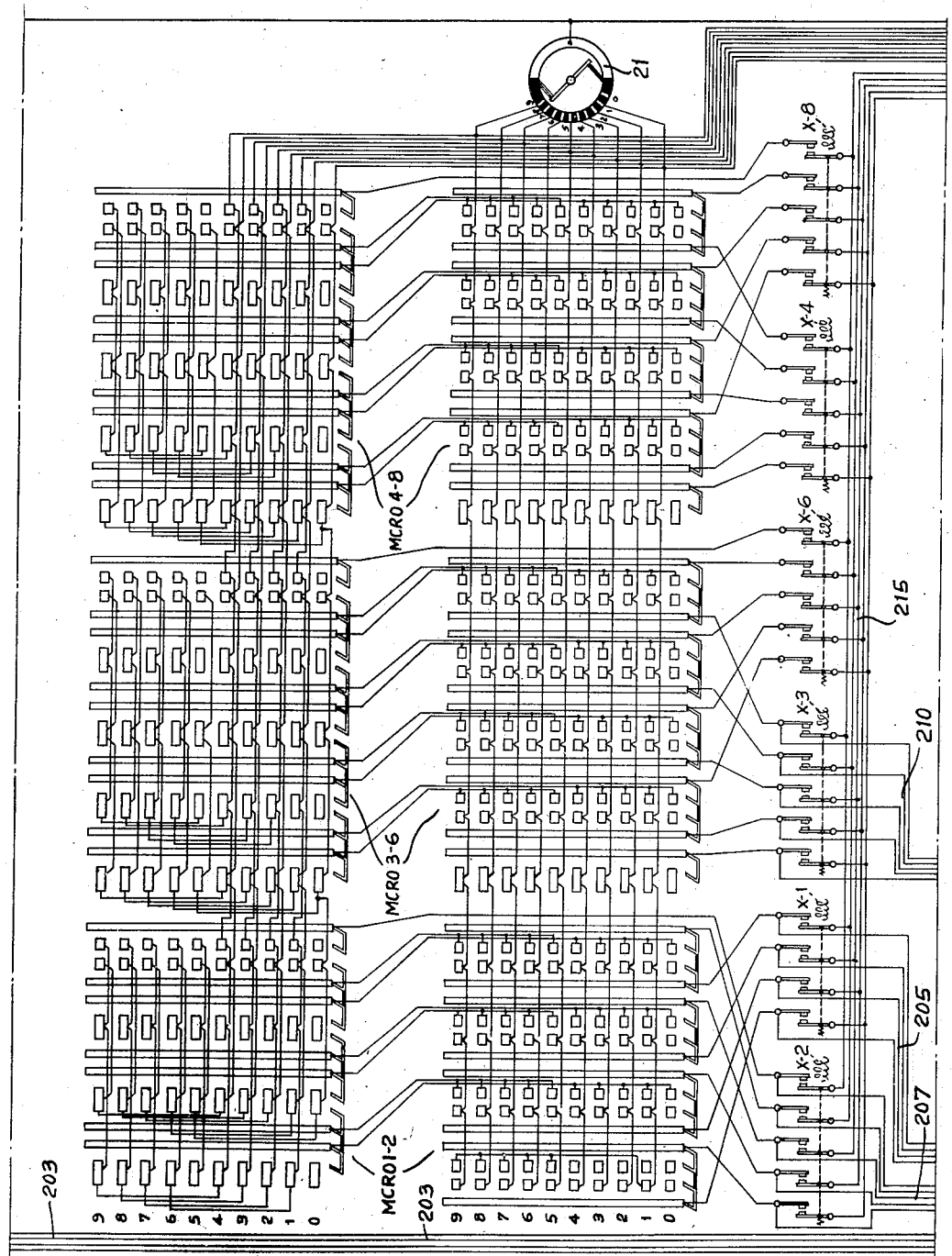

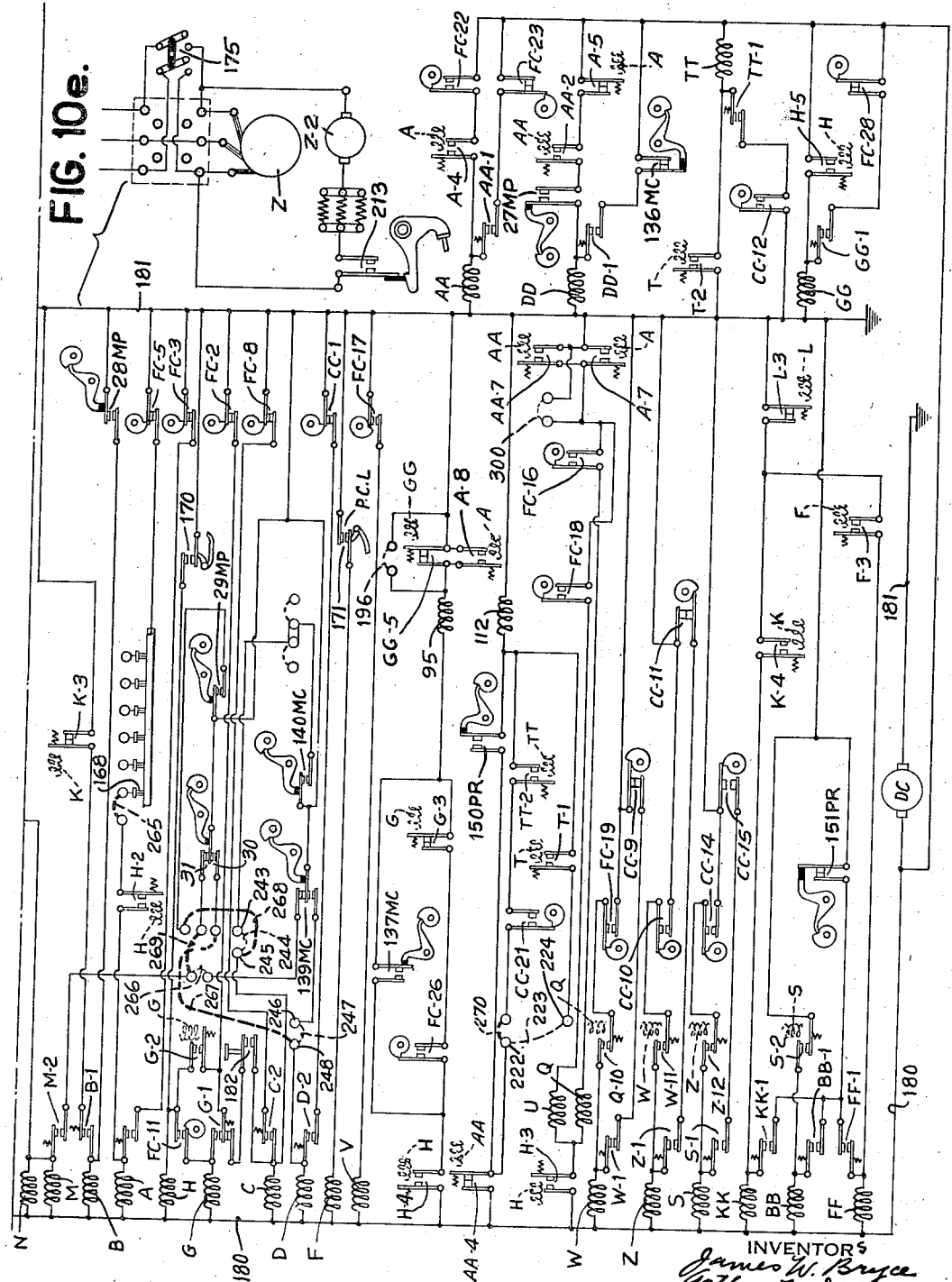

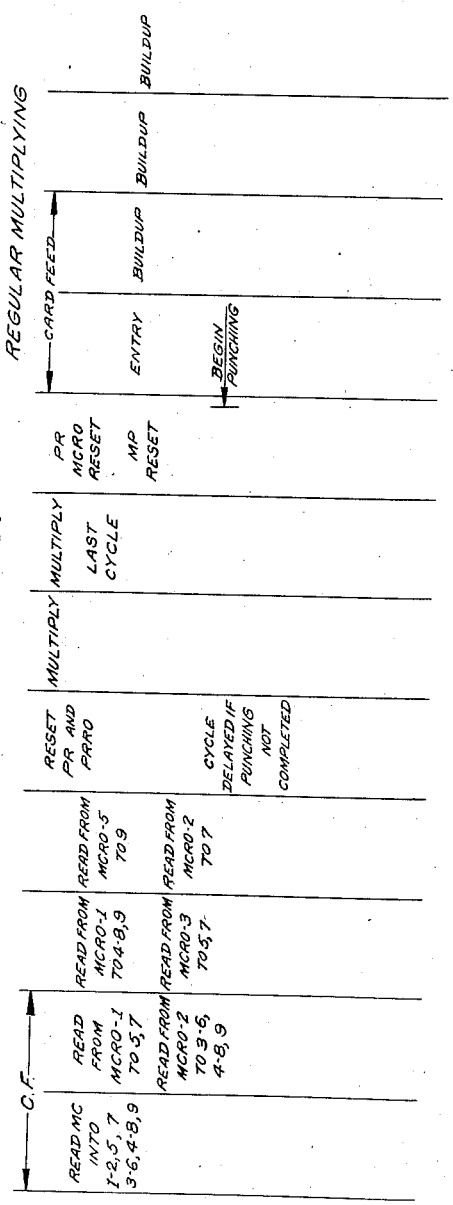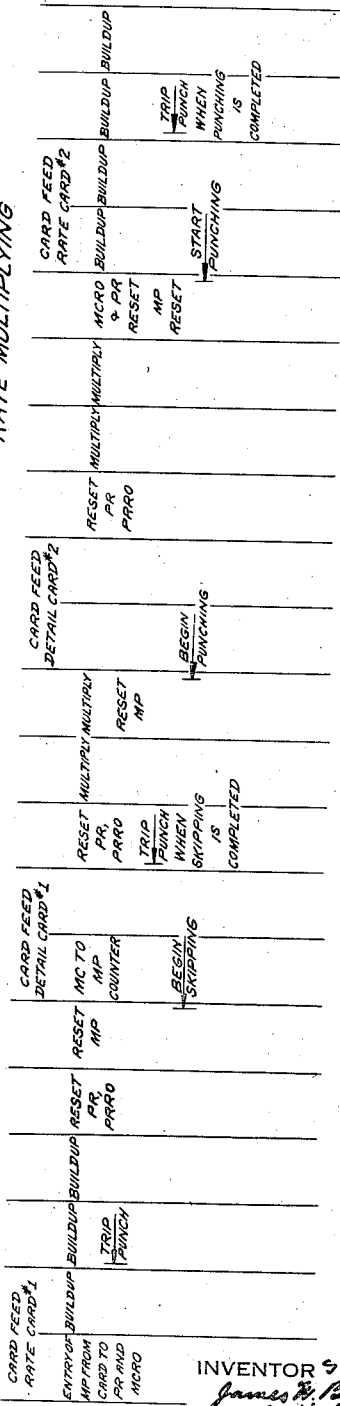

Patented Oct. 29, 1940

2,219,737

UNITED STATES PATENT OFFICE 2,219,737

CALCULATING MACHINE

James W. Bryce, Glen Ridge, N. J., and Arthur H. Dickinson, Bronxville, N. Y., assignors to International Business Machines Corporation, New York, N. Y., a corporation of New York Application June 9, 1937, Serial No. 147,168

17 Claims. (Cl. 235—61.6)

Multiplying machines have been devised in which multiplication has been carried out by first building up multiples of an entered multiplicand and wherein such multiplicand multiples were subsequently selectively added according to the corresponding digits of the multiplier. Typical machines of the foregoing type are shown in British Patents Nos. 456,367 and 456,368 and in United States application Serial No. 35,072, filed August 7, 1935, and in British Patent No. 457,136, corresponding to United States Serial No. 78,123, filed May 6, 1936.

In the foregoing former machines, the different multiplicand multiples were usually built up upon accumulative type receiving devices. With some forms of machines nine of said receiving devices were utilized one for each multiple. In other machines a lesser number of receiving devices were employed by utilizing doubling or times 5 readout devices on certain receiving devices. In other machines to obtain simplicity of construction and to lessen the number of relatively costly accumulators, resort has been had to the expedient of providing an incomplete series of multiples and using the sum and/or difference of, for example, two of such multiples to obtain an additional multiple or multiples. Furthermore, in addition to the accumulative type receiving devices for the multiplicand multiples, the machines have always required at least one result receiving device and frequently two result receiving devices were provided.

The present invention has for its general objects an improvement and simplification of construction of machines of this class and in the provision of a combined factor multiple pre-computing and result receiving device for use in lieu of separate multiple computing and result receiving devices.

A further object of the present invention resides in the provision of a multiplying machine having a combined factor multiple pre-computing and result receiving device.

A further object of the present invention resides in the provision of novel controls for multiplying machines and more particularly novel controls for multiplying machines employing a combined factor multiple pre-computing and result receiving device.

A further object of the present invention resides in the provision of a novel calculating unit for multiplying machine, said unit comprising a combined factor multiple pre-computing and result receiving device.

A further object of the present invention resides in the provision of an improved and simplified cycle controller for multiplying machines and particularly for record controlled multiplying machines.

A further object of the present invention resides in the provision of a novel form of readout device and means for driving and positioning the same.

A further object of the present invention resides in the provision of control means for a calculating apparatus, including a plurality of readout means which are positioned by accumulating means and which readout means are adapted to be selectively de-clutched from the positioning accumulating means and utilized after being de-clutched for controlling further entries into the accumulating means both for originally setting the readout means which are maintained in driving relation with the accumulating means and for also controlling the accumulating means during final result calculating operations.

A further object of the present invention resides in the provision of a novel combined accumulator and readout arrangement with means for clutching and de-clutching the readout means to the accumulator, means for independently resetting the accumulating means and the readout means which are positioned thereby and means for controlling the readout means by the accumulator and for also controlling the accumulator by the readout means after said readout means have been de-clutched from the accumulator.

A further object of the present invention resides in the provision of novel readout means and means for controlling the same whereby certain of a plurality of readout means may be reset at one time and other readout means may be reset at a different time.

A further object of the present invention resides in the provision of a novel form of multiplying machine adapted for rate card operations wherein time is saved upon such rate card operations. More particularly it is an object of the present invention to provide a multiplying machine construction adapted for rate card operations wherein multiple building up cycles are required only for rate cards and wherein building up cycles are obviated for detail cards.

A further object of the present invention resides in the provision of novel machine controls to eliminate supplemental cycles upon rate card operations and to combine maintained cycles in such a manner as to speed up the operating time of the machine.

A further object of the present invention resides in the provision of a novel combined accumulator and readout means including a plurality of readouts which are driven by the accumulator and separately disconnectable from the driving accumulator upon the accumulation of variable amounts in the accumulator with the readout means effective upon disconnection from the accumulator to form control means controlling the entry of supplemental amounts into the self-same accumulator which positions the readout means.

A further object of the present invention resides in improvements in rate card multiplying machines and machine controls therefor to the general end that machine operating time may be saved. More particularly it is an object of the present invention to provide means whereby a machine cycle is eliminated for all detail cards except the last detail card of groups which precede a new rate card.

Other objects of the present invention relate to general improvements in multiplying machines; improvements in the controls therefor; improvements in record card controlled multiplying machines and the controls therefor; improvements in multiple pre-computing means for multiplying machines and the controls therefor; improvements in declutchable readout means and driving positioning and control means therefor; and other features hereinafter described.

Further and other objects of the present invention will be hereinafter set forth in the accompanying specification and claims and shown in the drawings which show by way of illustration a preferred embodiment and the principle thereof and what we now consider to be the best mode in which we have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together with Fig. 1a to the right of Fig. 1, show somewhat diagrammatically the general arrangement of the various devices of the machine and the drive therefor;

Fig. 2 is a timing diagram of the cam contact devices used in the machine;

Fig. 3 is a front view of the result receiving and multiples of the multiplicand steup mechanism. This figure is taken substantially on line 3—3 of Fig. 1 looking in the direction of the arrows;

Fig. 8 is an expanded or disassembled view of a readout brush and segment structure and the driving mechanism therefor;

Fig. 9 is a sectional view of the card feeding and reading unit;

Figs. 10a, 10b, 10c, 10d and 10e, taken together and arranged vertically in the order named, show the complete circuit diagram of the machine; and Figs. 11 and 12 show timing diagrams of the machine; Fig. 11 shows the timing diagram for regular multiplying operations and Fig. 12 is the timing diagram for rate card operations.

Machine drive

In general, the various units of the machine are driven and operated in a generally similar manner to similarly located units of the machine shown in the U. S. patent to Daly, No. 2,045,437. The machine embodies a card feed, card handling and sensing section which is shown in cross-section in Fig. 9 and which is also shown to the top and right of Fig. 1a. A detailed description of the card handling and sensing section need not be given as it is identical with that of a similar section in the machine of the Daly patent above referred to. As in the Daly patent, a number of FC cams are provided which include cam contacts FC—3, FC—2, FC—15, FC—16, FC—17, FC—18 and FC—19, FC—22, FC—23, FC—24, FC—26, FC—27 and FC—28. The machine also comprises FC cam contacts FC—5 to FC—11 inclusive, which like cam contacts FC—3 are timed to correspond with similarly lettered cams in the machine of the Daly patent. The CC cam contacts shown on the timing diagram include cam contacts CC—2, CC—6, CC—9, CC—10, CC—11, CC—12, CC—14, CC—15 and CC—21. In addition to these CC cam contacts shown in the timing diagram, additional CC cams are provided, viz., cam contacts CC—1. Cam contact CC—2 and cam contacts CC—1 are timed to correspond with similarly lettered cams which are shown in the Daly patent.

There is also provided the customary punching unit which is diagrammatically indicated in Fig. 1a and labelled "Punching unit."

The machine includes the usual driving motor Z (Fig. 1), a D. C. generator marked "DC" which is also shown on Fig. 10e of the wiring diagram. The usual impulse distributor 20 is provided which is driven in the customary manner from the CC cam contact drive shaft. Likewise there are provided two emitters designated 21 and 22 (Fig. 1) which are driven in the customary manner.

Accumulators and entry receiving devices

Figure 1:
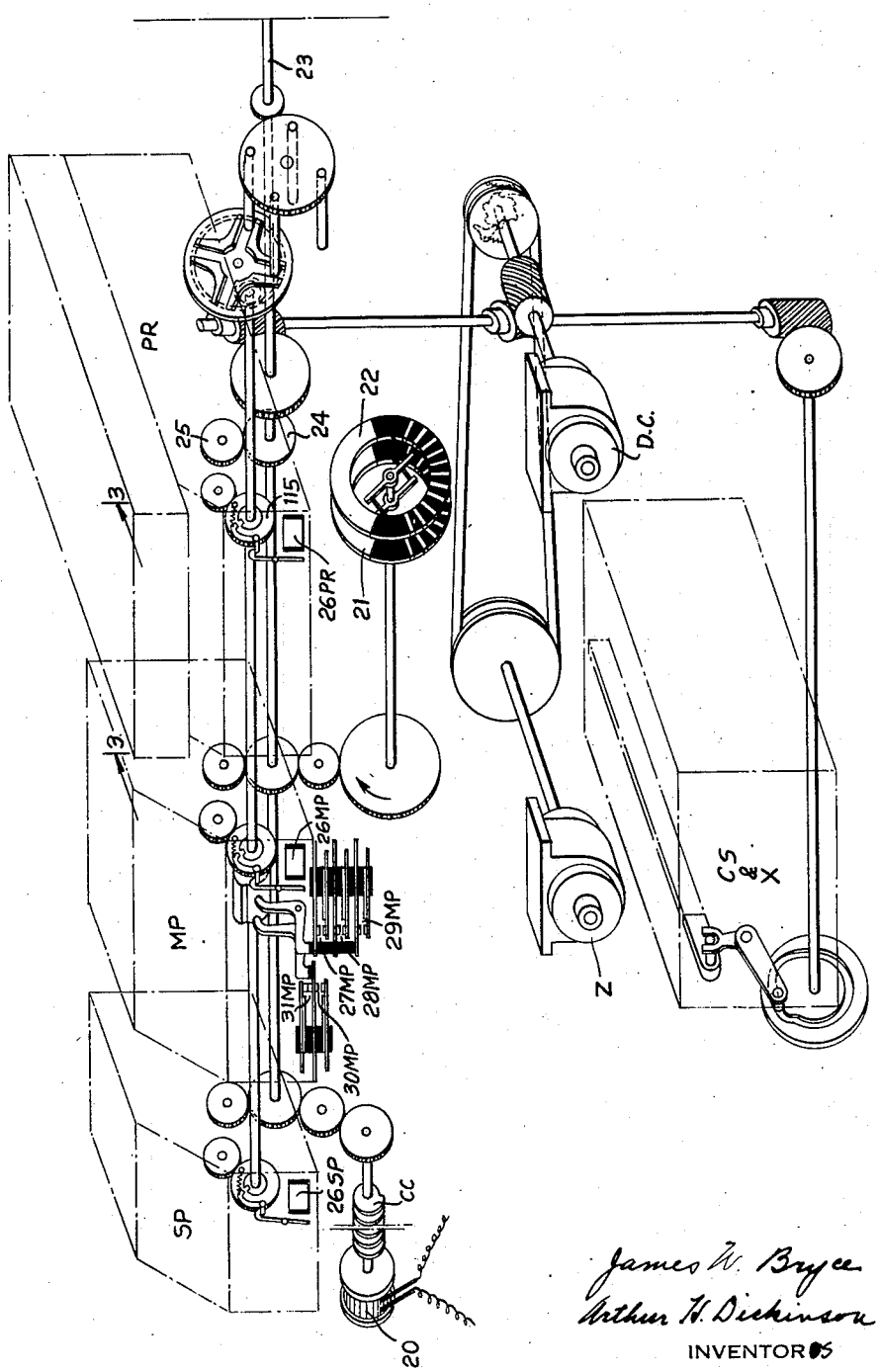

The machine here shown comprises two entry receiving devices preferably of the accumulator form designated SP and MP (Fig. 1). SP is a summary products accumulator for receiving a summation of products. MP is the amount manifesting or entry receiving device for the multiplier.

In lieu of providing receiving devices for the multiplicand and multiples thereof, and separate result receiving devices for the product components, a combined unit is provided which not only is used to receive and set up the multiples of the multiplicand, but which unit also receives and accumulates the components which make up the product and which unit also sets up the final product. This unit is generally designated PR in Fig. 1 and is driven from the main drive shaft 23 by gearing generally designated 24, 25 (Fig. 1).

The various entry receiving devices and accumulators are provided with reset controls including control magnets 26SP and 26MP. The MP receiving device has reset controlled contacts which are shifted upon reset. Contacts 27MP, 28MP, 29MP and 30MP are shifted to closed position upon reset of MP and contacts 31MP are opened upon reset of MP.

The machine also includes the usual electromechanical multi-contacts which are of the type shown in the Daly patent these being disposed in a unit generally designated CS and X on Fig. 1.

PR unit

Before describing the mechanical details of the PR unit, its general mode of operation will be briefly described.

Upon the read out of the multiplicand amount from the card, this multiplicand amount is entered in a double manner into the PR unit. The PR unit may be considered as a large accumulator which may be considered as divided in the middle so that an entry of the multiplicand may be placed in the left hand orders of the unit and a similar entry of the multiplicand may be concurrently placed in the right hand end of this unit. The PR unit is provided with a series of sets of readout means or devices. Certain of these readout devices are of the so-called doubling type.

Considering first the left hand section of the PR unit this unit includes three readouts which upon original entry are concurrently driven. Such three sets of readouts comprise MCRO—1—2, MCRO—5 and MCRO—7. The right hand end of PR is likewise provided with three sets of readout devices which, upon original entry of the multiplicand, are concurrently driven. These readouts include MCRO—3—6, MCRO—4—8 and MCRO—9. After the entry of the original multiplicand amount into both sections of the PR unit, provision is made for de-clutching the MCRO—1—2 readout from the accumulator driving and positioning mechanism. Thereafter upon the next following machine cycle MC×1 is read out from the now de-clutched MCRO—1—2 unit and entered into the left end of PR to bring the readouts set thereby to a position representing the sum of the originally entered multiplicand and the transferred multiplicand amount. For setting the right hand readouts there is a readout of MC×2 from MCRO—1—2 and an entry of such amount into the right hand end of PR to bring the wheels and readouts to a setting corresponding to the sum of the multiplicand and twice the multiplicand. This provides a 3 multiple setting for MCRO—3—6, MCRO—4—8 and MCRO—9. Upon the completion of this entry MCRO—3—6 will have received its final setting so that it may be and is de-clutched from the other readouts and from its positioning accumulating means.

Upon the following machine cycle there is a readout of MCRO—3 from the right hand readout section into the left hand section of PR to give a further setting of MCRO times 5 and MCRO times 7. During the same cycle, MC times 1 is read from the left hand section and entered into the right hand section of PR to provide further setting to MCRO—4—8 and MCRO—9. These operations complete the setting of the MCRO—5 and MCRO—4—8 readout devices and these readouts can now be de-clutched. Upon the next cycle there is a readout of MC times 2 from the readout in the left hand section back into the same section of PR to finally position the MCRO times 7 readout. From the left hand section there is a final readout of MCRO times 5 which is entered into the right hand section of PR to give a final setting of the MCRO—9 readout. The MC×5 and MC×9 readouts are now de-clutched from PR.

The above gives the general plan of operation of the PR unit for setting up the multiples of the multiplicand on the various readout sections. The PR unit is likewise provided with readout sections for the product amount which will be subsequently described.

It may be explained that before the actual multiplying operations take place that all of the MCRO multiple readouts are de-clutched from the PR unit and are stationary during multiplying cycles.

According to the present invention means such as MCRO—1—2; 3—6; 4—8; 5, 7 and 9 are provided from which any one of all of the digital multiples of one factor, such as the multiplicand may be directly read out. Means such as PR are also provided for setting the last mentioned means in accordance with amounts based on such factor. This last mentioned means PR also comprises the result receiving means of the machine, being adapted to be cleared after it has been used for setting up multiples and being thereafter used as a receiving device for selectively receiving multiples from the means from which any one of all the multiples may be directly read out. The foregoing means afford a calculating unit which is a combined factor multiple pre-computing and result receiving means.

Figure 5:
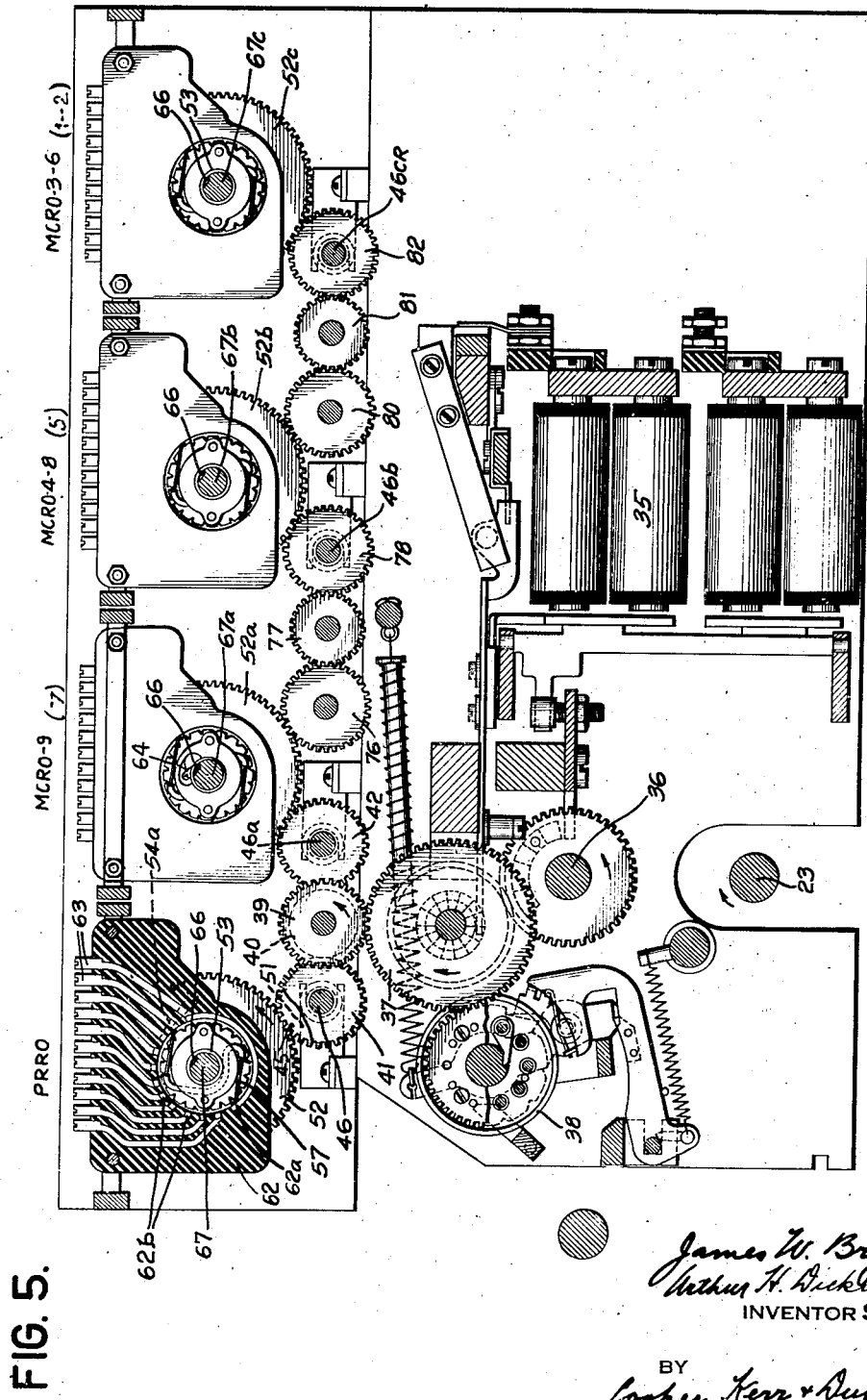
Fig. 5 is a sectional view of the mechanism shown on Fig. 4, the section being taken substantially on line 5—5 of Fig. 4, looking in the direction of the arrows.

Referring now to Fig. 5, the bottom portion of the PR unit comprises a conventional accumulator of the so-called relay-less type which is shown and fully described in United States patents to Lake Nos. 1,307,740 and 1,976,617.

The accumulator comprises the usual electromagnetic clutch devices and is also provided with the customary Hollerith transfer mechanism. For such transfer mechanism see United States patent to Hollerith No. 974,272 and see also United States patent to Lake No. 1,976,617.

The usual reset controls are provided which are like those shown in the Daly patent above referred to. The reset mechanism resets the accumulator wheels in the customary manner and from these wheels other mechanism is reset as will be subsequently described. Reset mechanism and its details are shown in United States Patent No. 1,600,414.

In Fig. 5, 35 represents the customary accumulator magnets. 23 is the main drive shaft of the machine which through the gearing 24, 25 (see Fig. 6) drives shaft 36. Shaft 36 drives the clutch shaft in the customary manner and each shiftable clutch unit drives a gear 37, which in turn drives the accumulator wheel 38.

Further description of the accumulator need not be given as it is identical with well known accumulators of the prior art.

One clutch gear 37 is provided for each denominational order in the PR unit, both for the right hand and left hand section thereof. Each gear 37 drives an intermediate gear 39 which has fixed to it another gear 40 (see Figs. 4 and 5). Each gear 40 in turn drives a gear 41 and also drives a gear 42. Each gear 41 has fixed thereto a toothed clutch element 43. The clutch element 43 is normally disengaged from a cooperating toothed element 44 (Fig. 3) which is fixed to a gear 45. Gear 45 and clutch element 43 are freely rotatable on shaft 46. Fixed to shaft 46 adjacent gear 45 is a collar 47. It will be understood that by endwise shifting of shaft 46 to the right, clutch elements such as 43—44 can be engaged. Resilient means such as spring means 48 normally tend to disengage the various clutch elements.

It may be explained that the gear 41 previously referred to is freely rotatable upon shaft 46. The various gears 41 are retained in endwise relation with respect to the shiftable shaft by means of a collar 50 which is carried by each gear 41 and which collar is provided with an annular groove to receive fingers such as 51 which are fixed to a suitable frame part of the machine (see Figs. 3 and 5).

The manner of engaging the clutches will be subsequently described.

It will be assumed that clutches such as 43—44 are engaged, whereupon drive will be provided as follows: From gear 37, the drive from the accumulator clutch will be imparted through the train including 37, 39, 40, 41, 43, 44 to 45. Gear 45 in turn drives a gear 52. Gear 52 comprises the readout setting means.

Referring now to Fig. 8, each setting gear 52 has fast to it a sleeve 53 which forms a support for the rotatable elements of the readout. These rotatable elements comprise a detent disc 54 which cooperates with a spring pressed detent 54a (see Fig. 5), a spacing plate 55 and brush carriers 56. There may be varied numbers of brush carriers depending upon the number of readouts desired. Each brush carrier 56 carries brushes 57 which are received in grooves 57a formed in the face of each brush carrier 56.

All of the aforesaid movable parts of the readout are secured to the gear 52 by threaded studs 59.

The disc 54 is recessed at its rear as indicated at 60 to provide clearance for the flange 61 on gear 52. Each brush device traverses a segment generally designated 62 (Fig. 5). The segment 62 is made of insulating material and includes common conducting segments 62a and the usual spot conducting segments 62b. The common segment 62a and the individual conducting spots 62b are wired out to terminals such as 63 in order to provide for wiring connections thereto. The readout in its general details as to segment and brush construction forms no part of the present invention, the same being fully described in the copending application of C. D. Lake, Serial No. 84,677, filed June 11, 1936.

Unlike readouts of the Lake type as shown in the above application, the present readout provides novel reset means for the readout brush structure. Such reset means comprises a spring pressed pawl 64 (Fig. 8) which is carried by one of the brush carriers. This spring pressed pawl is adapted to project through a slotted aperture 65 in the sleeve 53 and engage a reset notch 66 (see Fig. 5) which is disposed upon a central reset shaft 67 which passes through the sleeve 53. The manner of rotating such shaft and like shafts for reset will be subsequently described.

It may be mentioned that it is new to provide readout means positioned by an accumulator which are connectable and disconnectable therefrom and to provide reset means for the readouts so that they may be reset independently of the extent of accumulator reset. Heretofore, readouts were reset concurrently and to the extent which the positioning accumulator wheel was reset. With the present construction the accumulator wheel is not connected to the readout during resetting so that the accumulator wheel, for example, may be reset two increments and the readout say eight increments. It is a further feature of the instant invention that the readouts may be stationary with the accumulator which was used to position it or them in motion. This enables a readout or readouts to be used when in a stationary condition for controlling entries into the accumulator.

The segments of each readout unit are secured to brackets 70 (Fig. 4) which in turn are fixed to cross-frame members 71 which are in turn secured to end plates 72 and 73. The end plates are supported in any suitable manner and are secured above the bottom or main accumulator unit in any suitable manner.

The foregoing description has described a single readout unit. It will be understood that the various readout units so far as their construction is concerned, are identical and a detailed description of the other units need not be given. The readout to the extreme left of Fig. 5, which is shown in section is readout PRRO, viz., the readout from which final results are read out. This readout PRRO is provided for all orders of the PR device. The next readout to the right of PRRO on Fig. 5 for the right end section is MCRO—9. The readout in alignment with it (in back of it) and upon the left hand section is MCRO—7 shown dotted and in parenthesis on Fig. 5. The next readout to the right for the right hand section is MCRO—4—8 and that for the left hand section is MCRO—5. The readout to the extreme right of Fig. 5 for the right hand section is MCRO—3—6 and that for the left hand section is MCRO—1—2. Inasmuch as reset of certain different readout units is to occur at different times, the resetting shafts will be given distinct reference characters such as 67, 67a, 67b and 67c (Fig. 5).

Figure 4:
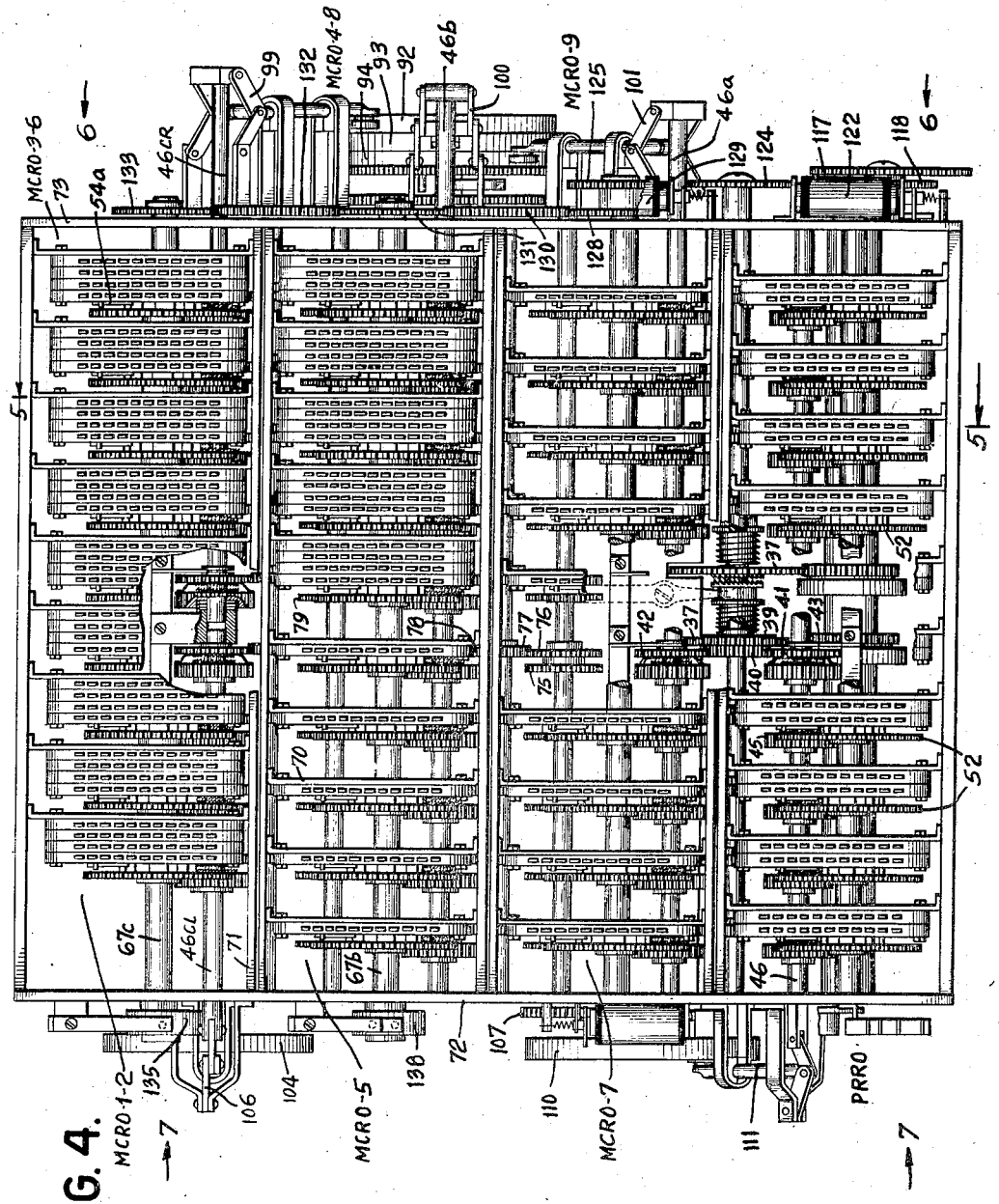
Fig. 4 is a top plan view of the unit shown in Fig. 3, the view being taken substantially on line 4—4 of Fig. 3, looking in the direction of the arrows.

Gears such as 42 are disposed on a clutch shaft similar to 46 and designated 46a (Figs. 5 and 4). On this shaft are clutches similar to those previously described, which, through gear connections like those previously described, drives setting gears 52a for the next readout. This readout gear 52a drives a gear 75 which has fast to it a gear 76, which gear drives an intermediate gear 77, which in turn drives a clutch gear 78 similar to 41 and 42 disposed on clutch shaft 46b. The usual clutches like those previously described drive the gear 52b of the next readout which in turn drives a gear 79 and 80 (like 75 and 76 previously described) and gear 80 in turn drives another clutch gear 82. Gears such as 82 for the readouts associated with the right hand end of the PR unit are provided with a shaft 46cR. The readouts for the left hand units are provided with a clutch shaft 46cL. It will be noted that clutch shafts 46a, 46b are continuous shafts which extend completely across the PR unit. The rearmost readouts (see Fig. 4) have individual clutch shafts which are designated 46cL, "L" signifying left and 46cR, "R" signifying right.

It will be understood that the clutches such as 43—44 for each denominational order are provided on all of the clutch shafts 46, 46a, 46b, 46cR and 46cL.

Referring now to Fig. 4, the PR readout is of so-called dual type with a double set of segments for each order. The MCRO—5, MCRO—7 and MCRO—9 readouts are also of single type with single segments for each order. The MCRO—1—2 readout, the MCRO—3—6, MCRO—4—8 are quadruple readouts, being provided with four sets of segments.

Readout clutch controls

In the operation of the machine and as will be subsequently described, on entry of the multiplicand into the PR unit from the record the PRRO readout will be de-clutched on the entry cycle. All of the other readouts will be clutched up so as to receive the entry of the multiplicand. After the entry of the multiplicand into the right and left sections prior to the next build up cycle, the MCRO—1 and 2 readout is de-clutched. Following this cycle the MCRO—3—6 readout is de-clutched. At the end of the next cycle MCRO—5 and MCRO—4—8 are de-clutched. At the end of the last cycle MCRO—7, MCRO—9 are de-clutched.

In order to clutch in the various multiplicand multiple readouts at the beginning of operation the following mechanism is provided.

Figure 6:
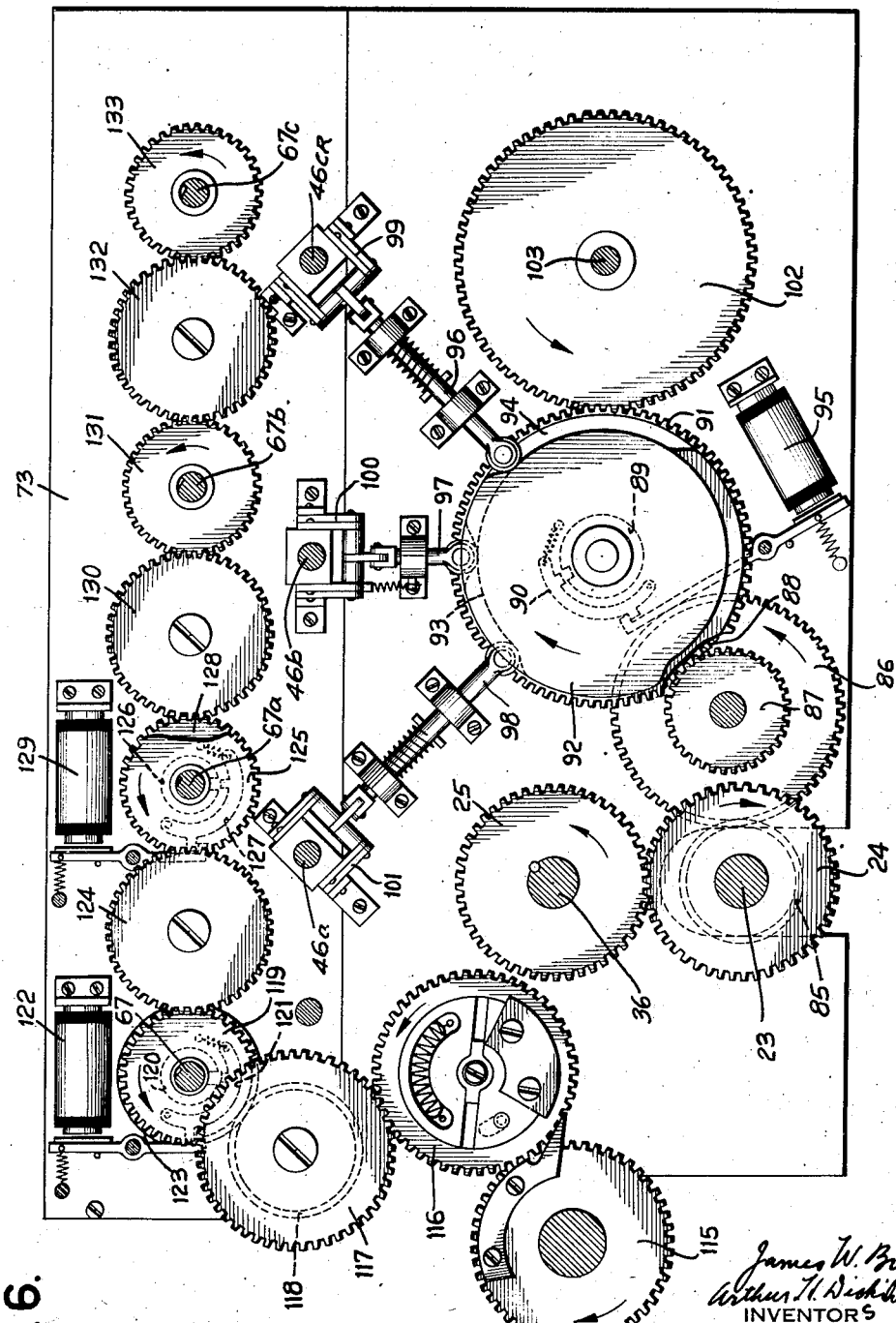
Fig. 6 is a side view of the mechanism shown on Fig. 4, the view being taken from the right as shown by the arrows 6—6 on Fig. 4.

Referring to Fig. 6, a gear 85 is fixed to main drive shaft 23. This gear drives gear 86, which in turn drives gear 87 fast to it, which provides drive for a gear 88, which carries a notched clutch disc 89 of a one-revolution clutch. The clutch dog 90 is carried on a gear 91, which has fast thereto three cams 92, 93 and 94. The one-revolution clutch is engaged upon the energization of a clutch magnet 95. With the clutch magnet 95 engaged, the cams 92, 93 and 94 rotate clockwise for one revolution. One revolution of cam movement comprises five machine or accumulator cycles. At the beginning of the first machine cycle of such five cycles, the cam 92 pushes upward a follower 96, the cam 93 pushes upward a follower 97 and cam 94 pushes upward a follower 98. All of the foregoing followers are spring pressed into cooperation with their cams.

Follower 96 upon outward movement straightens a toggle generally designated 99 (Fig. 4) to draw shaft 46cR to the right in Fig. 4. This engages the clutches for the MCRO—3—6 readout devices. Follower 97 upon outward movement (Fig. 6) straightens a toggle 100 (which is similar to toggle 99 which is more clearly shown) and such toggle 100 draws out to the right shaft 46b (Fig. 4). This engages all of the clutches for readouts MCRO—5 and MCRO—4—8. Follower 98 upon outward movement straightens a toggle 101 (Fig. 4) to draw out to the right shaft 46a to engage the clutches for driving readouts MCRO—7 and MCRO—9. To engage the MCRO—1 and 2 readout, gear 91 (Fig. 6) drives a gear 102, which in turn drives shaft 103, turns a cam 104 (see Fig. 7). 104 on rotating elevates a spring pressed cam follower 105 to straighten a toggle 106 (Fig. 4) and push shaft 46cL to the right (Fig. 4) to thereby clutch up the MCRO—1—2 readouts. At the end of the first cycle which is a card reading cycle, cam 104 allows shaft 46cL to return to outward position to thereby declutch the MCRO—1—2 readout devices. At the end of the second machine cycle, the cam 92 permits follower 96 to move to allow 46cR to shift back to the left (Fig. 4) to disengage the MCRO—3—6 readout. At the end of the third cycle, cam 93 permits the follower 97 to move inward and to allow shaft 46b to move to the left to thereby de-clutch the MCRO—5 and MCRO—4—8 readout devices. At the end of the fourth cycle, cam 94 allows 98 to move inward (Fig. 6) and permit shaft 46a to move to the left to de-clutch the MCRO—7 and MCRO—9 readout devices.

Prior to the beginning of multiplying cycles, provision is made for clutching in the PRRO readout with the PR accumulator setting devices. This is effected in the following manner.

Figure 7:
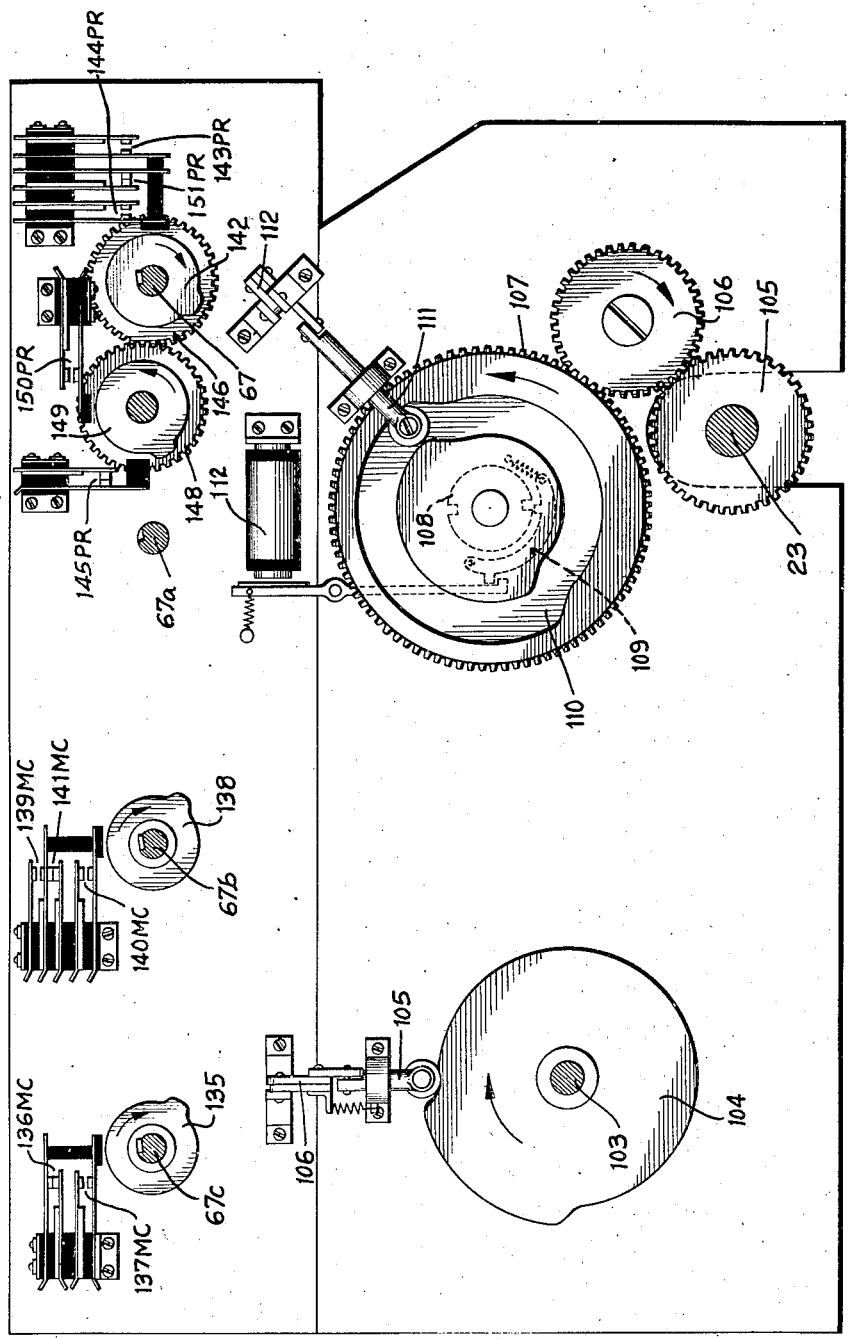
Fig. 7 is a left hand end view of the mechanism shown in Fig. 4, the view being taken on line 7—7 of Fig. 4.

Referring to Fig. 7, main counter drive shaft 23 through gear 105 and idler gear 106, drives a gear 107 to which is affixed the clutch disc 108. This clutch disc has two notches and the clutch may be termed a one-half revolution clutch. The clutch dog 109 is carried on a box cam 110 cooperating with a cam follower 111. Engagement with this clutch is effected by energization of a clutch magnet 112. Upon rotation of the box cam 110 the follower 111 moves inward (Fig. 7) to straighten a toggle 112 (see also Fig. 3) and moves shaft 46 to the right to engage all of the PRRO readout clutches. The PRRO readouts remain clutched during multiplying operations, the cam follower 110 being in the inner track of the box cam during all multiplying cycles. After multiplying cycles are completed, magnet 112 is again energized to further rotate the box cam and move 111 outward to its original position to de-clutch the PRRO readout devices.

From the foregoing it will be understood that upon completion of the entry and accumulating operations in which multiples are built up upon the readout means for the multiples, all such readouts for multiples are de-clutched from the positioning accumulator. After the build up of the multiples the PR accumulator is reset to zero. After it is reset the PRRO readout is clutched to it to receive settings therefrom. This is the normal sequence for regular multiplying but upon rate card operations following the feed of a rate card, there is no clutching up of the PRRO readout.

It should be understood that reset of PR does not necessarily imply a reset of PRRO since PRRO may be declutched from PR at the time of such PR reset. A separate resetting means is provided for PRRO and such reset may operate concurrently with the PR reset or at a different cyclic period according to the required control conditions.

*Readout reset mechanisms and controls*

Referring to Fig. 6, gear 115 and the mechanism generally designated 116 is the conventional reset structure employed in tabulating machines, see for example Lake Patent No. 1,600,414. The mechanism 116 drives a gear 117, which has fixed to it a gear 118, which in turn drives gear 119 freely rotatable upon shaft 67 and having fixed thereto the disc element 120 of a one-revolution clutch. The dog 121 of this one-revolution clutch is released by a magnet 122 and when this one-revolution clutch is engaged, shaft 67 rotates through a complete revolution and brings about reset of the PRRO readout devices. The clutch dog 121 is fixed to a plate 123 which is fixed to shaft 67. Rotation of gear 119 drives gears 124 and 125. 125 has fixed to it a one-revolution clutch disc 126 having a clutch pawl 127 carried by a gear 128, which is fastened to reset shaft 67a. This clutch is engaged by energization of a magnet 129. Gear 128 (Fig. 4) drives a train of gears 130, 131, 132 and 133. Gears 131 and 133 are respectively fast to reset shafts 67b and 67c.

It will be understood from the foregoing that energization of 122 will cause all of the PRRO readout devices to be reset to normal position. Energization of 129 on the other hand will reset all of the MC multiple readout devices concurrently.

*Reset controlled contacts*

Referring to Fig. 7, shaft 67c is provided with a cam 135, which upon reset, opens contacts 136MC and closes contacts 137MC. Shaft 67b is provided with a cam 138, which upon reset closes contacts 139MC and 140MC and opens contacts 141MC. Reset shaft 67 is provided with a cam 142, which upon reset closes contacts 143PR and 144PR and opens contacts 151PR. Affixed to cam 142 is a gear 146, which drives gear 148, having fixed thereto a cam 149 and adapted upon reset to close contacts 150PR and open contacts 145PR.

Card handling and punching section

The card handling and punching mechanism of the instant machine is of a type well known in the art and no detail mechanical description of the same is necessary. Reference may be had to U. S. patent to Daly, No. 2,045,437 for details of construction and an explanation of the arrangement of the card reading, card handling mechanism, punching devices, etc.

Referring, however, to Fig. 9, the card magazine is shown at 160, the picker at 161, the card feed rolls 162 which deliver the card to the contact and transfer roll 163. This contact roll passes the card under the usual sensing brushes 164 and under the advanced sensing brush 168 and finally delivers the card through the usual intermediate rolls to the tray of the punching mechanism which tray is generally designated 169. The usual card lever contacts 170 are provided and punch card lever contacts 171 are also provided.

Circuit diagram

With pre-punched cards in the card magazine 160 (Fig. 9), the operator closes switch 175 (Fig. 10e) providing a current supply for the main driving motor Z which then drives the D. C. generator. The D. C. generator supplies direct current to bus 180 and to grounded bus 181. The start key is now depressed to close start key contacts 182 (Fig. 10e) and complete a circuit from D. C. bus 180, through relay coil C, through start key contacts 182, through relay contacts G—1 now closed, through cam contacts FC—2 and back to line 181. A stick circuit is established through the contacts C—2 and through cam contacts FC—8. Relay contacts C—1 are also closed and a circuit is established through contacts F—1 (Fig. 10d), through card feed clutch magnet 183 (see also Fig. 1a), through cam contacts FC—6, through the stop contacts 184, through relay contacts N—1 and C—1, through the punch contacts P—1, now closed and back to the other side of the line. As is customary the start key must be kept depressed for the first four cycles in starting up on a run or alternatively it may be depressed and redepressed. Starting is prevented until the feed rack of the punch is in right hand position, this being provided for by the usual P—1 contacts. On the circuit diagram the main sensing brushes 164 are designated 164MC and 164MP, MP and MC designating multiplier and multiplicand.

During the first card feed cycle, there is the usual preliminary MP reset, this being brought about by current flowing in a circuit from line 180, through contacts H—1 now in the position shown, through cam contacts FC—9 to plug socket 185, thence via plug connection 186 to socket 187 to the MP reset magnet 26 to socket 188 and then via plug connection 189 to a socket 190 and back via wire 191 to socket 192 and via plug connection 193 to a socket 194 to ground 181. While the MP reset contacts 28MP (Fig. 10e) close during MP reset and there is a momentary energization of relay coil B, this operation is an idle one because relay coil B is not retained energized due to the K—3 contacts being open.

Card lever contacts 170 become closed towards the end of the first card feed cycle. Accordingly, relay coil H (Fig. 10e) becomes energized. With relay coil H energized, relay contacts H—1 shift to reverse position from that shown. Relay contacts H—2 (Fig. 10e) become closed. With relay contacts H—2 closed, upon the closure of cam contacts FC—26, a circuit is completed from line 180, through contacts H—2, through FC—26, through relay contacts G—3 now closed, through MC entry clutch magnet 95, through a plug connection 196 and back to line 181. Energization of 95 clutches up all of the MCRO readout devices for drive from the PR setting device. As the second card feed cycle ensues, the card is carried past the brushes in the usual way.

Briefly, the entry circuits may be traced as follows: From line 180 (Fig. 10a), through H—1, now in shifted position, through FC—7, through impulse distributor 20, to card transfer and contact roll 163, through the brushes 164MP pertaining to the multiplier and 164MC pertaining to the multiplicand to plug sockets at plug board 197. The usual plug connections are provided at this plug board and connected to the lower sockets are the usual three-blade contacts 198 and 199. These contacts are positioned as shown for normal multiplying operations and may be shifted manually by member 200 to reverse position for checking purposes to reverse the entries and for rate card operations. The cross-wiring generally designated at 201 provides for such reversal. Entry circuits extend in the usual way to the multiplier magnets 202MP and provide for the entry of the multiplier in the customary manner. The return circuit to ground from the 202MP magnets is through relay contacts A—2 now in the position shown.

In order to provide for the multiplicand entry at this time, relay coil U (Fig. 10e) must be energized. Such circuit is energized with relay contacts H—3 closed upon closure of cam contacts FC—18. For normal multiplying the supply circuit to cam contacts FC—18 and FC—16 is through a plug connection 300 which shunts contacts A—7 and AA—7. Upon rate card operations this plug connection is removed to insure that the energizing circuit for relays U and Q will be only operable during the feed of a rate card. Entry circuits 203 are entry circuits for the multiplicand entries from the card and with multi-contact relay U—1 energized, these circuits are established to provide for a dual entry of the multiplicand into PR, one entry being made into the left hand side of PR and a duplicate entry being made into the right hand side of PR. For entries into the left hand side, the circuits are completed through relay contacts U—1—4 now closed, through Q—1—4 now in the position shown, through W—3—6 now in the position shown, through Z—3—6 now in the position shown to the plug board generally designated 204, thence via plug connections at such plug board to the entry magnets 35PR pertaining to the left hand end of the PR calculating device, the current finally flowing back to ground 181. For the entries into the right hand section of PR, the entries flow from lines 203, through U—5—8 now closed, through Q—6—9, W—7—10, Z—8—11 now in the position shown, to the right hand 35PR magnets.

The foregoing operation will have completed the dual entry of the multiplicand into PR from the card.

During the cycle in which the MC entries are being effected into PR, relay coil V (Fig. 10e) becomes energized upon closure of cam contacts FC—17. With relay coil V energized, relay contacts V—1—4 (Fig. 10a) shift to reverse position. Relay coil V becomes energized only at the zero index point of the card cycle and accordingly if any zero appears in the record card the related relay Y magnets will become energized. Once energized, such magnets remain energized by virtue of their stick contacts $Yu$—1 to $Yth$—1, the stick circuit being completed to line through FC—15. The pick-up circuit for one of the Y relay coils will be traced for one order. From line 180, through H—1, through FC—7, through the impulse distributor 20, at the zero index spot, through the contact roll 163, through a brush 164MP, through plug connection at 197, through the right hand contact 198, down over via cross-line, through V—4 now shifted to $Yu$ and thence to ground.

The Y magnets constitute the usual cycle controller controls and their operation for cycle control purposes need not be explained in detail as such operations are explained in Daly Patent No. 2,045,437. It is to be noted, however, that these Y magnets are energized directly from the card analyzing means and are not controlled by any intermediate retaining means such as by MPRO as heretofore.

At this stage of the operation as stated before, the amount of the multiplicand is entered in a dual manner into PR. The next operation following such entry is to de-clutch MCRO—1—2. This is brought about at the end of an entry cycle into PR by cam follower 105 returning to normal lower position, which shifts the clutch shaft 46cL to disengage all of the MCRO—1—2 readout devices from the setting and driving means therefor.

The machine is now ready on the following cycle to read out the times 2 multiple of MC from the doubling readout section of the MCRO—1—2 readout and concurrently with this operation there is read out the times 1 multiple of the multiplicand from this same readout. This is brought about by closure of FC—16 which occurs in the second machine cycle of the card feed cycle. FC—16 energizes relay Q of Fig. 10e. With Q energized and with the relay U de-energized which takes place following the entry from the card, relay contacts Q—1—4 and Q—6—9 (Fig. 10c) shift to reverse position from that shown. With emitter 21 (Fig. 10b) in operation, the times one multiple of the multiplicand is read out from the MCRO—1 section of its related readout and such multiplicand entry flows over a group of lines generally designated 205 (Figs. 10b and 10c) via branch lines 206, through contacts Q—1—4 now in shifted position, through contacts W—3—6 now in the position shown, through contacts Z—3—6 now in the position shown to and through the connections at plug board 204 to the 35PR magnets to enter the one multiple of the multiplicand into the left hand section of PR.

Concurrently with the foregoing entry the times 2 multiple of the multiplicand is read out from the doubling readout section of MCRO—2, impulses originating at emitter 21, flowing through the doubling readout section of MCRO—2, flowing through lines 207 (Fig. 10b and Fig. 10c), via branch lines 208, through the Q—5—9 contacts, now in shifted position, through the W—7—10 contacts in the position shown, through the Z—7—11 contacts, now in the position shown, through connections at plug board 204 and to the 35PR magnets pertaining to the right section of PR and back to ground. This enters double the multiplicand into the right section of PR.

Following the foregoing entries, relay Q becomes de-energized, this de-energization occurring upon opening of contacts FC—16 (Fig. 10e). However, before relay coil Q is de-energized and just before its de-energization as shown on the timing diagram, relay contacts FC—19 close to establish a circuit through relay contacts Q—10 now closed to energize relay magnet W. Relay magnet W upon being energized, remains energized by stick contacts W—1, the stick circuit being completed to line through cam contacts CC—9.

After the foregoing entry of the multiplicand and double the multiplicand has been made, the cam devices of Fig. 6 de-clutch the MCRO—3—6 readout from its setting elements.

The machine is now ready for a further building up of multiples of the multiplicand. The relay coil W becomes energized in the manner previously explained. With relay coil W energized and with relay coils Q and U de-energized, further entries are made as follows: There is a read out of the times 3 multiple of the multiplicand from MCRO—3, which entry is directed into the left hand section of PR. This entry is derived in the following manner. With emitter 21 in operation, impulses flow through MCRO—3, thence via lines 210 (Figs. 10b and 10c), thence through the W—2—6 contacts now in shifted position, through the Z—2—6 contacts now in the position shown, to the plug board, through the plug connections at the plug board and to the 35PR accumulator magnets at the left of the PR device and back to ground. Concurrently, with this entry a times one multiple is read out from MCRO—1 over the lines 205, through the W—7—10 contacts now in shifted position, through the Z—8—11 contacts in the position shown, via the plug connection at the plug board to the 35PR accumulator magnets at the right hand side of the PR unit. With relay coil W energized, relay contacts W—11 (Fig. 10e) become closed and there is an energization of relay coil Z at the time contacts CC—10 close. Relay Z being energized in this manner remains energized by reason of stick contacts Z—1, the stick circuit being completed to line through cam contacts CC—11. At this stage of the operations, the MCRO—5 readout and the MCRO—4—8 readout, are de-clutched from their setting mechanisms. Such de-clutching is effected by the dropping off of follower 97 from cam 93, which causes a shift of the clutch control shaft 46b in the manner previously described.

With relay coil Z energized in the manner above described, a further build up cycle ensues and there is a read out of the multiplicand times 2 from MCRO—2. The entries flowing via lines 207 direct to the Z—2—6 contacts which are now in shifted positions. From these contacts, the entry flows via the plug connections at plug board 204 to the 35PR magnets at the left of the PR device. Concurrently with this multiple entry there is an entry of the 5 multiple of the multiplicand into the right end of PR. The impulses flow from emitter 21, through MCRO—5, thence via lines 211, through the now shifted Z—7—11 contacts, via the plug connections at plug board 204 to the 35PR magnets at the right of the PR unit. During such entry, the relay contacts Z—12 (Fig. 10e) are closed and also during the entry, upon closure of cam contacts CC—14, relay coil S becomes energized, S being energized, is maintained energized by the stick circuit through stick contacts S—1 and cam contacts CC—15.

Following the last multiple entry there is the final de-clutching of the MCRO readouts, this being effected by follower 98 (Fig. 6), riding down to lower position on its cooperating cam 94. This action shifts 46a in reverse direction and disengages the clutches for the MCRO—7 and MCRO—9 readout devices.

During the next to last multiple building up cycle, provision is made for carrying the card transversely in the punch in the customary manner to product punching position. The initiating circuit for this operation is as follows: Relay coil F (Fig. 10e) is energized in the usual way when the card reaches the receiving position in the punch and closes the punch card lever 171 (Fig. 9). With F energized, relay contacts F—1 shift to reverse position (Fig. 10d). As is customary in machines of this class, punch contacts P—1, P—3 and P—5 (Fig. 10d) are now closed. With P—5 closed, relay K will be energized and the K—1 contacts will be shifted. With the punch contacts P—3 also closed, the punch clutch magnet 212 will be energized upon closure of cam contacts CC—6, the circuit being through K—1, P—3, 212, CC—6, through F—1 now in shifted position. The punch motor latch 213 becomes latched in the usual manner providing current supply for punch driving motor Z—2. The card will now advance through the punch in the customary manner to the position in which product punching may commence.

Before multiplying cycles may ensue, the PR accumulator, the accumulator wheels and primary clutch wheel drives must be reset to normal position. This is effected in the following manner. With coils F and K energized, contacts F—3 and K—4 (Fig. 10e) are closed. With such contacts closed and with L—3 contacts closed, relay coils KK and FF are energized and such coils upon being energized, remain energized by reason of stick contacts KK—1 and FF—1, the stick circuit being completed back to line through the 151PR contacts. With relay coil S energized in the manner previously described, relay contacts S—2 are closed, which causes energization of relay coil BB. This relay coil is maintained energized by closure of stick contacts BB—1, the stick circuit extending back to line through the 151PR reset control contacts. With KK, BB and FF thus energized, relay contacts KK—2 (Fig. 10a) and contacts FF—2 are closed and with the L—2 contacts closed, upon closure of cam contacts CC—2, current will flow through KK—2, L—2, FF—2, BB—2 to energize a relay coil JJ and the PRRO reset clutch magnet 122, see also Fig. 6.

With JJ energized, relay contacts JJ—1 close and establish a circuit to energize the 26PR reset magnet, see also Fig. 1. With this magnet energized, reset gear 115 is caused to rotate, whereupon the PR accumulator is reset in the customary manner. There is likewise a reset of the PRRO readout due to the PR reset clutch magnet 122 now being energized, but such reset is an idle one so far as clearing the readout of a setting is concerned because at this mite there is no setting on PRRO. This condition is only true for the first card of a run, thereafter there will be a setting of PRRO prior to this clearing operation. Such setting of PRRO will be the product amount. The PRRO readout is reset at this time for initiating further operations through the reset control contacts associated with PRRO. Upon PRRO reset contacts 150PR close during reset (see Fig. 10e). Upon such contacts closing, clutch magnet 112 (see also Fig. 7) becomes energized and this magnet upon being energized in the manner previously described clutches up the PRRO readout to the driving devices therefor. This clutch up is effected after PRRO is reset to zero. The opening of the 151PR contacts (Fig. 10e), which occurs during PRRO reset, de-energizes relay coils KK, BB and FF. Closure of the 144PR contacts which takes place during PR reset cycle causes energization of relay coil L and with such coil L energized, a stick circuit is established therefor through stick contacts L—1, the stick circuit extending back to line through cam contacts FC—27. With contacts 144PR closed and upon closure of contacts 143PR (Fig. 10d), relay coils M and N (Fig. 10e) become energized.

The machine is now ready to begin actual multiplication. It will be understood at this stage of the operation that all digital multiples of the multiplicand from 1 to 9 are available for readout from the various readout devices which have been set up to provide for the representing of such multiples. For simplicity of explanation, it will be assumed that the multiplicand amount was 111 and that the multiplier amount was 82. Upon energization of relay coil M, relay contacts M—1 (Fig. 10a) close and upon closure of cam contacts CC—2 current flows through the M—1 contacts now closed, through the J—2 contacts which are now in the position shown down through the Yu—2 shift contacts now in the position shown, through the CSu column shift control magnet, through the brush of MPRO in the units order and out through the X—2 multiple selecting magnet to ground. Since the energizing circuit to X—2 is through the related column shift magnet CSu then at the proper time in the operation the contacts of this electro-mechanical column shift relay close so that the entry flowing through the contacts is directed into proper columnar relation into PR. The closure of contacts X—2 allows an entry representative of the two multiple of the multiplicand to be read out from MCRO—2, the entries flowing through the X—2 contacts (Fig. 10b) now closed, via lines 215 (Figs. 10b and 10c), through the CSu contacts and to the PR accumulator magnets. This enters 222 in the PR accumulator. Upon the closure of the CSu contacts, supplemental CSu—1 contacts (Fig. 10a) become closed in the customary manner bringing about energization of Yu and causing the shift of the Yu—2 contacts to reverse position from that shown. Thereupon, upon the next closure of CC—2 contacts, current again flows from line through CC—2, through M—1, through J—2, in the position shown, through Yu—2 in shifted position, through Yt—2, in the position shown to the CSt column shift magnet, through the brush of MPRO of the tens order standing on the 8 spot and out through the X—8 relay to ground. Energization of CSt changes the column shift entry relation (see Fig. 10c) in the usual manner. Energization of X—8 establishes a readout circuit from the MCRO—8 readout so that impulses representative of the 8th multiple of the multiplicand is 111×8=888 can flow through the lines 215, through the closed column shift contacts, to the PR accumulator. This will provide a further entry of 888 in the PR accumulator and 888 added to the 222 already therein will provide a final accumulator setting of 9102, which is the product of 111×82. This same amount of 9102 will also have been set up on the PRRO readout, since during entries of the multiplicand multiples into PR, PRRO is clutched up to the denominational setting devices.

In the above problem. inasmuch as the multiplier was 0082 during the entry of the multi-Yh and Yth energized, the Yh—2 contacts and Yh and Yth energized, the Yh—2 contacts and the Yth—2 contacts will be in shifted position so that upon the next closure of cam contacts CC—2, current will flow in the path previously traced through all of the Y—2 contacts which are in shifted position, through the T coil to ground. Current also flows to plug socket 216, via plug connection 217, to socket 218 and thence to the HH relay magnet, through the reset magnet 129 to socket 219 via plug connection 220, socket 221 to ground. This brings about a reset of the PR accumulators and the MC multiple readout devices.

Another circuit is also established through FC—10, to socket 185, thence through plug connection 186, socket 187, through the 26MP reset magnet, to socket 188, thence via plug connection 189 to 190, over line 191, to plug socket 192, via plug connection to socket 194 and thence to ground. Energization of 26MP effects reset of the Mp receiving device in the usual manner. Energization of relay coil HH closes relay contacts HH—1 (Fig. 10a) to effect reset of the PR accumulator wheels.

It may be mentioned at this point that the PR accumulator wheels are reset without resetting the PRRO readout because the PRRO readout is required to retain its setting to control the punching out of the product. Energization of 129 clutches all of the MC multiple readouts to the reset drive for PR so that these MC multiple readout devices become reset in this cycle. Relay coil T upon being energized closes relay contacts T—1 (Fig. 10e) establishing a circuit traced as follows: From line 180, through the AA—4 contacts, to socket 222, via plug connection 223 to socket 224, and completes a circuit to energize the 112 clutch magnet (see Fig. 7). Energization of this clutch magnet declutches all of the PRRO readout devices and this action occurs before the accumulator wheels start to reset. During MP reset, contacts 28MP close to energize relay coil B. This coil remains energized through stick contacts B—1, the stick circuit being completed back to line through the K—3 contacts now closed. It may be mentioned that the K—3 contacts re-close upon the feed of the card to the punching position in the punch. Energization of relay coil B closes contacts B—2 (Fig. 10d).

With B energized, relay contacts B—2 also close establishing a circuit from the 181 side of the line through B—2, through the escapement contacts 230 on the punch, through the switch 231, through the checking contacts 232 now in the position shown, through the contacts E—1 now in the position shown, through a circuit 233 to the common conducting strip 234 in the punch.

With current supplied to the readout strip 234 in this manner and with brush 235 standing on the first of the spots 236, at the first product punching position, punching will commence, there being a read out in the usual way through the related section of PRRO and an energization of the usual punch selector magnets 237.

It will be understood that plug connections are made from sockets 238 to sockets 239 which are wired to one section of the PRRO readout so that the product can be punched.

With relay contacts B—2 closed, current is supplied to contacts 240 in the punch (these being the interposer controlled contacts) so that current is supplied to the punch operating magnet 241. Punching operations will then proceed in the usual way and finally the card will pass to beyond the last column position whereupon punch contacts P—5 will be closed, energizing relay coil K and shifting contacts K—1 and establishing a circuit to the eject magnet 242. A new operation will then be initiated upon a succeeding record card. The energization of relay coil K will cause opening of relay contacts K—3 (Fig. 10e) and bring about de-energization of relay coil B.

In order to initiate a new card feed cycle relay coil C is energized in the following manner. Upon MC reset, contacts 140MC (Fig. 10e) close establishing a circuit from grounded line 181, through 140MC to plug socket 243, via plug connection 244 to socket 245 to relay coil C and back to line 180. With relay coil C thus energized, card feed and other operations occur in the manner previously explained. During the card feed cycle, which is initiated as above described, the cam contacts FC—27 (Fig. 10d) open, de-energizing relay coil L. Relay coil L, upon being de-energized, allows relay contacts L—2 (Fig. 10a) to re-close in order to permit a reset of PR at the proper time. The contacts were previously maintained open to prevent inadvertent and undesired reset. Contacts L—2 are those customarily employed in machines of this class. L—3 also re-close to permit a new energization of KK and FF at the proper time.

Previous to a new card feed cycle and upon reset of the MCRO readout devices, contacts 137MC (Fig. 10e) close and energize the 95 clutch magnet. The circuit is as follows: From line 180, through the H—2 contacts now closed, through the 137MC contacts now closed, through the 95 clutch magnet, through the plug connection 196, back to grounded line at 181. During the following card feed cycle, relay coil G being energized, relay contacts G—3 are open and prevent an energization of 95 upon closure of the FC—26 cam contacts. On last card operations, magnet 95 becomes energized before the relay contacts H—2 open. On each card feed cycle at the beginning of the cycle relay coils Y (Fig. 10a) are de-energized upon the opening of cam contacts FC—15.

At the time when the multiplicand multiple readout devices are being reset, contacts 139MC (Fig. 10e) shift to reverse position from that shown. The shift of these contacts opens the holding circuit for M and N and de-energizes these relay coils. The shift of these contacts also energizes relay coil D through a circuit including plug socket 246, plug connection 247, socket 248, through relay coil D to line 180. With relay coil D energized, a stick circuit is provided for it through D—2 and cam contacts CC—1. With relay coil D energized, relay contacts D—1 (Fig. 10e) close, providing current supply for emitter 22. The emitter 22 directs impulses into one section of the PRRO readout, such impulses flowing to the SP accumulator magnets 250.

It will be understood that proper plug connections are provided between sockets 251 and 252 to permit entry of the product into the SP accumulator. Summary product operations may be dispensed with when desired by merely removing such plug connections. The summary products accumulator is reset in the customary manner by hand reset key 253 (Fig. 10a), which when closed, establishes a circuit to the 26 SP reset magnet.

Figure 12 shows the timing diagram of the machine operating on regular multiplying operations. It will be noted from this timing diagram that the first machine cycle of the card feed cycle shown to the extreme left is the cycle wherein the amount is read from the card and entered in a dual manner into PR. Following this cycle, three machine cycles ensue which are the multiple building up cycles. Following these cycles there is machine cycle in which PR and PRRO is reset. On regular multiplying operations the reset of PR initiates multiplying. Two multiplying cycles are shown. Following the last multiplying cycle there is another PR reset and a concurrent reset of MP. MP reset initiates punching which begins in the MP reset cycle and which may continue over the entry cycle which follows and in one or more of the build up cycles following the entry cycle.

Rate card operations

Machines of this class are frequently used for socalled rate card operations. With rate card operations, one factor is taken from a rate card which precedes a group of detail cards. The other factor is derived from each detail card and is multiplied by the factor which was derived from the rate card and which factor was retained in the machine for a series of computations, being only cleared out when a new rate card comes along in a run of cards. When the machine is operating on regular card operations with both factors derived from each detail card in a run it will be understood that there is a build up of the multiples of the multiplicand for each detail card. This operation of building up the multiples for each card is to a certain extent time consuming and therefore on rate card operations it is desirable that the build up of the multiples be effected once for each rate card and accordingly once for each group of detail cards. This can be done by building up multiples from the factor which was derived from the rate card. Having once built up the multiples for the factor derived from the rate card, no further build up is required for each following detail card of the group and in this way operating time may be saved.

Before describing rate card operations, the timing diagram (Fig. 13) for rate card operations will be briefly referred to. On the card feed cycle which involves two machine cycles, the factor amount derived from the rate card is entered into PR on the first machine cycle of the card feed cycle. Thereafter several build up cycles ensue. Following these build up cycles there is a reset of PR and PRRO which takes place at the same time when such reset occurs with normal multiplying. Inasmuch as no multiplication is required with the amount derived from the rate card alone, multiplying cycles do not follow the PR reset cycle as in regular multiplying operations, but in lieu thereof MP reset immediately follows reset of PR on the following machine cycle. There is no reset of the MC readout devices required at this time because these readout devices are to retain their setting for subsequent control of computing operations pertaining to detail cards. On the following machine cycle there is a card feed of the detail card. On the first machine cycle of this card feed cycle, the amount read from the detail card is entered into MP. An idle cycle follows. Following this cycle there is a reset of PR and PRRO. Multiplying operations follow in succeeding cycles and on the last of these cycles, MP reset takes place. Punching is effected in the customary manner on the detail card and there is a resumed card feed of a further detail card followed again by PR reset and PRRO reset. Multiplying operations then again follow, followed by punching and in the event that the detail card is the last of a group there is a reset of the MCRO readout devices and PR concurrently with the reset of MP, the reset of MP being delayed until the cycle following the multiplying cycle in place of being in the cycle which comprises the last multiplying cycle.

To prepare the machine for rate card operations, the following settings and changes are made. First the member 200 (Fig. 10a) is shifted to the left to shift contacts 198 and 199 and direct the multiplier factor derived from the rate card into PR and to provide for the direction of the factor derived from each detail card into MP. Plug connection 193 (Fig. 10a) will be removed. Plug connections 186 and 217 are removed and substitute plug connections 260 and 261 applied as shown in heavy dotted lines. Plug connections 189 and 220 are removed and plug connections 262 and 263 are connected up as shown in heavy dotted lines. A plug connection 264 is connected as shown, this plug connection not being used on regular multiplying operations. A plug connection 265 is made (Fig. 10e), this connection not being used on regular multiplying operations. Plug connections 247, 266 and 244 are removed and in lieu thereof plug connections 267, 268 and 269 are applied as shown by the heavy dotted lines. Plug connection 196 is removed. Plug connection 223 is removed and a connection 270 established. Plug connection 300 (Fig. 10e) is removed.

Upon rate card operations, further operating time may be saved by arranging the machine to reset the MP receiving device during the last computing cycle which is made for each detail card when a rate card does not immediately follow. This operation is provided for by the plug connection 264 (Fig. 10a) which shunts the Yth—2 contacts when relay contacts A—6 are closed. The purpose of the A—6 contacts is to provide for normal resetting of MP following the last computing cycle in the event that rate cards come along in a run of cards in direct succession and for operations involving the last detail card of a group which is followed by a rate card.

In operating upon rate card operations the factor amount is read from each rate card and entered into PR. PR then builds up multiples of this factor upon the readout devices and such multiples are retained on the readout devices during all of the operations which ensue for calculations involving the following detail cards of the group. Upon the reading of the new rate card the readout devices are reset to zero and thereafter a new set of multiples is built up thereon based on the factor data, on such new rate card. For normal multiplying operations the MP device is reset on the cycle following the last computing cycle, i. e., result entering cycle. MP reset is utilized for initiating a new card feed cycle on a following card. When operating under rate card conditions operating time may be saved by initiating MP reset at an earlier stage in the operating cycles of the machine. Preferably such initiation of MP reset is effected at the end of cycle preceding the last computing cycle and concurrently with the energization of the last X relay so that reset will occur during the last result entering cycle of the computing cycles which are effected with the factor data derived from the detail cards.

Having made the foregoing setups of the machine for rate card operations, the machine is started in the usual way and in the manner previously explained. At the end of the preliminary card feed cycle, the so-called X brush 168 (Figs. 9 and 10e) establishes contact through the hole in the advance index point position which signifies that the card is a rate card. This brings about energization of relay coil A (Fig. 10e), contacts H—4 being closed and plug connection 265 being established. Relay coil A becomes energized upon closure of cam contacts FC—5. Also during the preliminary card feed cycle, magnet 95 (Fig. 10e) is energized in the manner previously explained. During the first half of the next card feed cycle, the multiplier amount derived from the rate card is entered into PR.

Relay coil U becomes energized upon closure of FC—18 and with relay contacts A—7 closed. The multiplier entry into PR is made through the shifted 198 contacts via the cross-wires 201 to the wires 203 which lead to PR. During this cycle, relay coil AA (Fig. 10e) becomes energized upon closure of FC—22, relay contacts A—4 being closed because of the previous energization of relay coil A. Relay coil AA is retained energized by a stick circuit extending through contacts AA—1 and cam contacts FC—23.

Upon rate card operations, relay coil J is energized in the following manner: Energization of relay coil A closes contacts A—8 (Fig. 10d) and when relay contacts FC—24 close, relay coil J will become energized. This coil once energized is retained energized by its stick circuit through contacts J—1 and reset contacts 145PR. Relay coil E is energized at the time J is energized, being in shunt with it, contacts P—4 being closed.

On rate card operations, the build up of the factor derived from the rate card is effected in the PR unit in the manner previously explained, except that relay Q now has points AA—7 in its pickup circuit which are closed at the time FC—16 closes. At the end of each card feed cycle, relay coil F is energized in the usual way and the card fed into the punch. As the card is fed into the punch, relay coil K becomes de-energized in the manner previously explained and allows the K—1 contacts to shift to the position shown. This provides a stick circuit for relay coil E through stick contacts E—2. Shortly after the above stick circuit is established, the P—4 contacts open in the customary manner and break the pickup circuit for relay coil E. Upon the completion of the build up of the multiples in the PR device and upon the readouts positioned thereby, relay coil BB (Fig. 10e) becomes energized in the manner previously explained, contacts BB—2 (Fig. 10a) close to complete the reset circuit to 122 and to energize relay coil JJ. These controls provide for the reset of PR and the PRRO readout.

Upon rate card operations, during PR reset, relay coils M and N are energized through a circuit completed through the 143PR contacts and the 144PR contacts (Fig. 10d). With relay coil M energized for a rate card operation and with relay coil J energized as above described, relay contacts M—1 (Fig. 10a) close and relay contacts J—2 shift to reverse position from that shown. Upon closure of CC—2 the current from line 180 flows through the now closed M—1 contacts through the shifted J—2 contacts direct to plug connection 261 to socket 187 through the MP reset magnet 26 via plug connection 263 to socket 221 to ground. This brings about reset of MP. At this time, however, there is no reset of the MCRO readout devices because of the fact that contacts A—1 (Fig. 10a) are open at this time due to the deenergization of A. Relay coil A becomes de-energized upon the opening of cam contacts FC—3.

The potential reset circuit for reset magnet 129 comprises the following circuit. From ground 181 (Fig. 10a) through the A—1 contacts when they are closed, through the line 191 to socket 190, via plug connection 262, to 219, through 129 to socket 218, via plug connection 260 to socket 185, through the FC—10 contacts, through the now closed J—2 contacts, through the M—1 contacts, through the CC—2 contacts to line 180. This reset circuit as explained is open with A de-energized because the circuit is interrupted by open contacts A—1.

When operating upon a rate card, relay coil J is retained energized until CC—2 (Fig. 10a) close, this being provided for by the time of opening of contacts 145PR (see the timing diagram).

During the same time that reset magnet 26 is energized a circuit is established to energize relay coil T.

When operating upon a rate card, it is not desired to either clutch in or clutch out the PRRO readout. Accordingly, the circuit to 112 (Fig. 10e) is interrupted by relay contacts AA—4, which interrupt one circuit to 112 which extends through the 150PR reset contacts and also interrupts another circuit to 112 which extends through the plug connection 270, the CC—21 contacts and the TT—2 contacts. Upon MP reset, the closure of the contacts 28MP energizes relay coil B (Fig. 10e) causing closure of contacts B—2 (Fig. 10d), providing a circuit through 230, 231, through contacts 232 in the position shown, through the E—1 contacts now in shifted position, punch magnet 241 and back to line. This circuit provides for the usual skipping out of the rate card in the punch. At completion of the skipping out of the rate card relay coil K becomes energized, the K—1 contacts (Fig. 10d) shift and relay coil E becomes de-energized. With E thus de-energized, the relay contacts E—1 shift back to the position shown to provide for the proper punching operations on following detail cards.

During MP the reset contacts 27MP (Fig. 10) energize relay coil DD. During MP reset, relay contacts 29MP (Fig. 10e) close, completing a circuit from line 181, through 29, through plug connection 268, socket 245 to complete a circuit through relay coil C. Relay coil C upon energizing, closes the contacts C—1 (Fig. 10d) and brings about card feed of the detail card. The factor on the detail card is then read therefrom and such factor is entered into the MP retaining device.

The cycle controller is set up in the usual manner.

It will be recalled that for regular multiplying operations when both factors are read from the detail cards, the building up operations follow the reading of the factors from the card. Further, with regular multiplying operations after the build up of the multiples, the PR device is reset and the reset of this device initiates multiplying operations. However, on rate card operations the building up of multiples has been completed with the factor derived from the rate card and there are no build up operations with the factor derived from the detail card. Accordingly, PR reset may be brought about immediately following the feed of the detail card through the card sensing section of the machine and following the skipping out of the preceding card to beyond the last column position in the punch. The initiating circuit for PR reset under these conditions is as follows: From line 180 (Fig. 10a), through KK—2 contacts now closed, through the L—2 contacts now closed, through the FF—2 contacts now closed, through the DD—2 contacts now closed, to the 122 magnet and the JJ magnet and back to line. DD—2 are closed at this time due to the energization of relay coil DD (Fig. 10e) which was energized in the manner previously explained. With 122 and JJ energized, PR is reset in the usual manner.

During PR reset contacts 150PR become closed and energize 112 to clutch the PRRO readout devices to the PR driving device. At this time relay contacts AA—4 are closed because relay coil AA is de-energized during the feed of the detail card. Multiplying now occurs in the usual manner.

When operating on detail cards during rate card operations, it is possible to advance the time of MP reset and thereby save operating time. MP reset may be effected during the last computing cycle for a given detail card for all detail cards, except the last detail card of a run followed by a rate card. This advanced reset of MP is effected by the following circuit.

On the last multiplying cycle, when the X magnet pertaining to the last order of the multiplier is being energized upon the closure of cam contacts CC—2 (Fig. 10a), a supplemental circuit is completed through one or more of the Y—3 contacts, the A—6 contacts now closed, through the plug connection 264 to relay coil T and another circuit is established through plug connection 261, through the MP reset magnet 26 which circuit extends through plug connection 263 back to ground. This brings about MP reset during the last computing cycle for each detail card. This circuit is not established for the last detail card of a group when such detail card is followed by a further rate card because under such conditions relay coil A will become energized and open contacts A—6. With relay coil T energized in the manner previously explained, relay contacts T—2 (Fig. 10e) close to energize relay coil TT, which TT relay remains energized through the stick contacts TT—1 and cam contacts CC—12. The energization of relay coil TT closes contacts TT—2 and during the following cycle, which is the last multiplying cycle upon the closure of a cam contacts CC—21 clutch magnet 112 is energized to de-clutch the PRRO readout devices.

Operations then ensue on succeeding detail cards in a similar manner as described for the previous detail card.

Upon a new rate card coming along in a run of cards, the relay coil A is energized in the manner previously described. The energization of relay coil A opens contacts A—6 (Fig. 10a) and also closes contacts A—1. The opening of A—6 brings about the delay of MP reset until multiplying operations are complete on the preceding detail card. The closure of the contacts A—1 provides an energizing circuit for the MCRO reset magnet 129 and relay coil HH. The circuit is as follows, from line through CC—2, through M—1 now closed, through J—2 in the position shown, through the shifted Y—2 contacts, through FC—10, to socket 185, via plug connection 260 to socket 218 to the 129 reset magnet and the HH relay to socket 219, via plug connection 262, 190, line 191, through the A—1 contacts now closed to ground. This brings about the reset of the MCRO readout devices to clear the same to zero and remove therefrom the build up multiple settings. During MCRO reset, contacts 136MC (Fig. 10e) open to interrupt the holding circuit for relay coil DD. With relay coil DD de-energized, relay contacts DD—2 re-open and thus cut off the advance reset control circuit for 122 and JJ. The machine is now in a condition for receiving a new amount from a rate card and operations take place as previously described.

It is possible that the last card of a run of cards through the machine may comprise a rate card. While this condition ordinarily would not occur, it is possible to occur and under this condition provision must be made to reset the multiple readout devices. To bring about such reset the following circuit is provided.

Figure 10A:
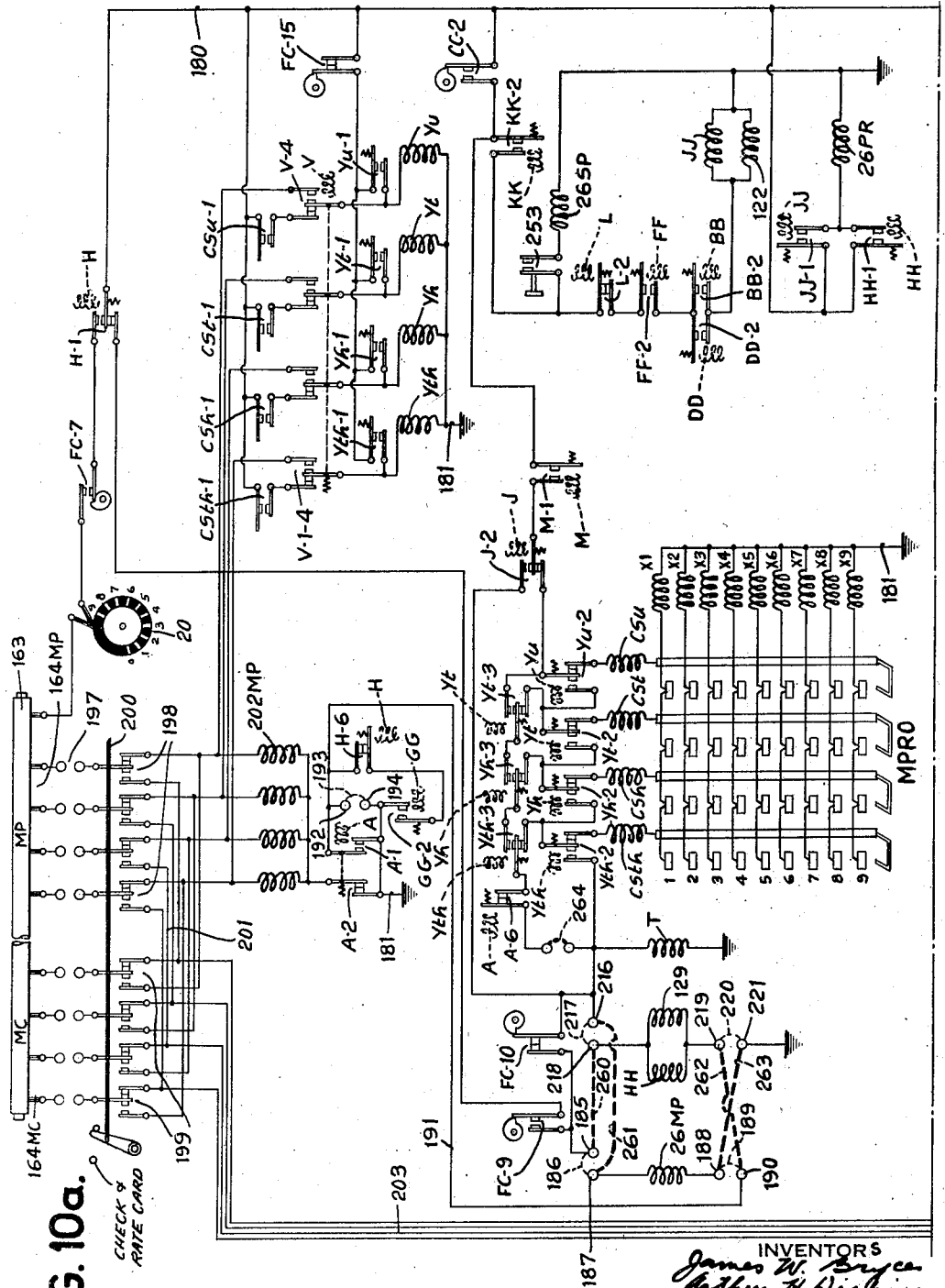
Figure 10C:
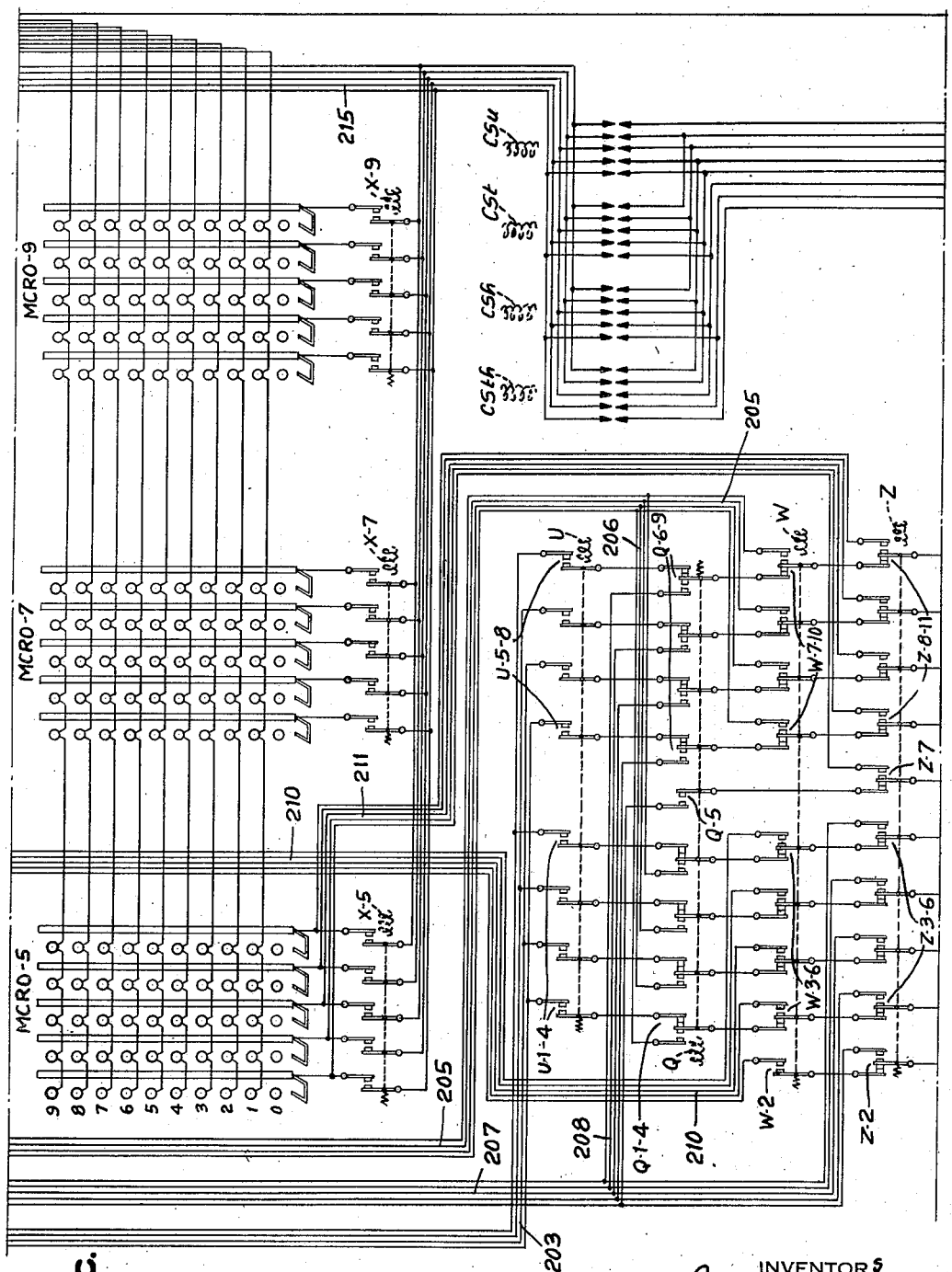
Figure 10D:
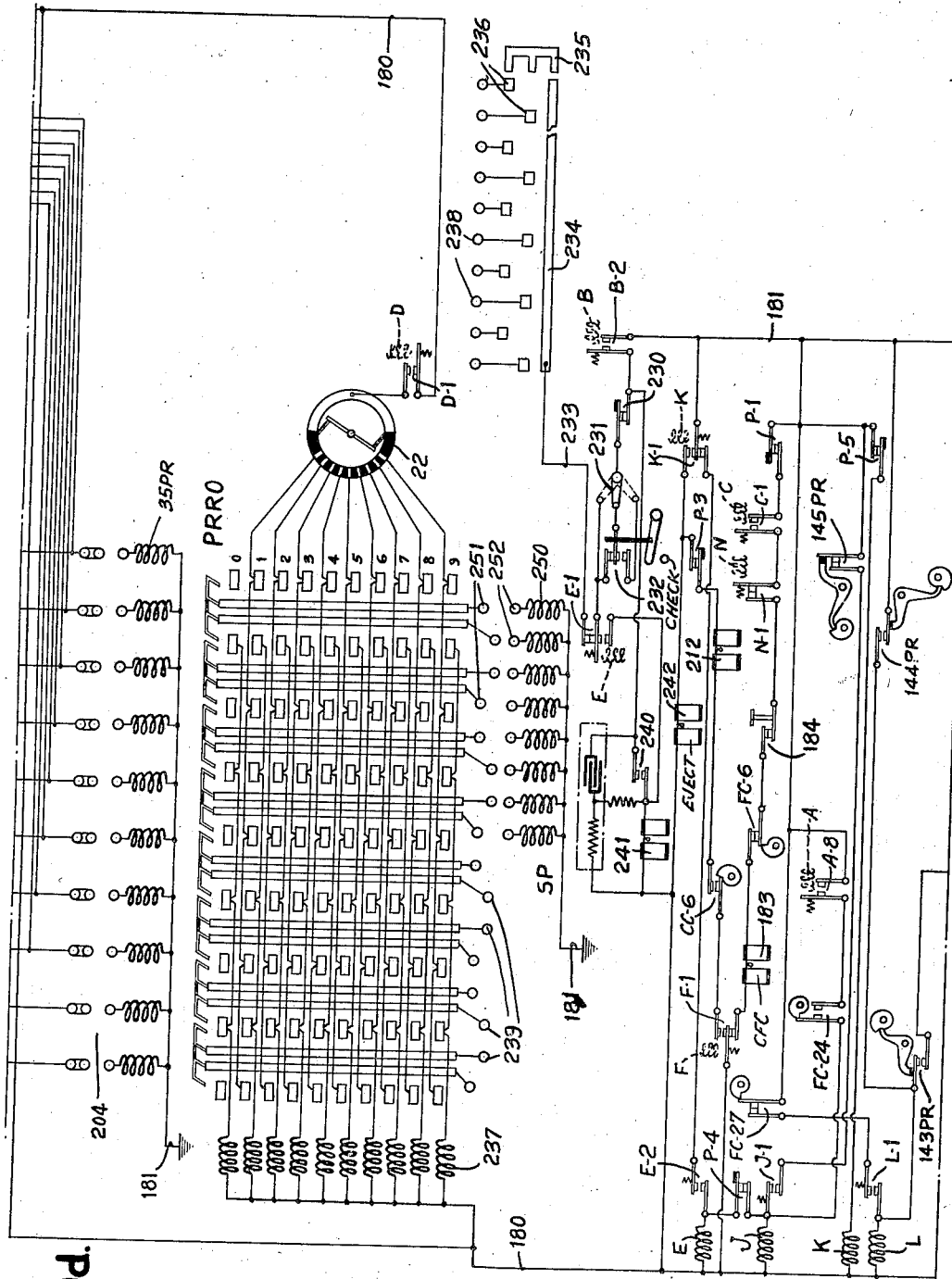

Referring to Fig. 10e, the relay coil GG becomes energized upon energization of relay coil H. Once energized, it remains energized through the stick circuit including stick contacts GG—1 and cam contacts FC—28. Following the feed of a rate card, which is the last card of a run through the machine, relay coil H is de-energized allowing contacts H—1 (Fig. 10a) to shift to the position shown and allowing contacts H—6 to close. With such contacts in this position a circuit is completed from line 180, through H—1 in the position shown, down through cam contacts FC—9, to socket 185, via plug connection 260, to socket 218, down through the 129 reset magnet and the relay coil HH to socket 219, thence via plug connection 262 to socket 190, via line 191, through the H—6 contacts now closed, through the GG—2 contacts which are still closed and back to ground. This circuit is ordinarily not effected on a regular run of cards because FC—9 close before GG becomes energized on regular preliminary card feed cycles. The foregoing controls are also effective upon the feed of a last detail card.

While we have shown and described a particular manner of building up multiples wherein the build up of the multiples is effected by using certain multiple values for transfer, the invention is not limited to the particular values of the multiples previously described. The arrangement previously described builds up multiples upon the pre-computing means in the following manner:

|  | PR | | | |
| --- | --- | --- | --- | --- |
|  | Left | | Right | |
|  | Amount | Accumulator and direct RO setting | Amount | Accumulator and direct RO setting |
| (a) Entry cycle | MC×1 | MC×1 | MC×1 | MC×1 |
| (b) 1st transfer | MC×1 | MC×2 | MC×2 | MC×3 |
| (c) 2d transfer | MC×3 | MC×5 | MC×1 | MC×4 |
| (d) 3d transfer | MC×2 | MC×7 | MC×5 | MC×9 |

With the foregoing the other multiples such as

X2, X6 and X8 are available from the doubling readouts.

The underlined amounts are those which are used for final read out. It will be understood that other multiples such as the 2, 6 and 8 multiple are derived from doubling readout devices.

Our invention contemplates the building up of the multiples by other values and typical alternative methods of procedure may be set forth in the tables below.

|  | PR | | | |
|---|---|---|---|---|
|  | Left | | Right | |
|  | Amount | Accumulator and direct RO setting | Amount | Accumulator and direct RO setting |
| (a) | MCX1 | MCX1 | MCX1 | MCX1 |
| (b) | MCX2 | MCX3 | MCX2 | MCX3 |
| (c) | MCX2 | MCX5 | MCX1 | MCX4 |
| (d) | MCX2 | MCX7 | MCX5 | MCX9 |
| | | or | | |
| (a) | MCX1 | MCX1 | MCX1 | MCX1 |
| (b) | MCX2 | MCX3 | MCX2 | MCX3 |
| (c) | MCX1 | MCX4 | MCX2 | MCX5 |
| (d) | MCX3 | MCX7 | MCX4 | MCX9 |

It will be understood that the foregoing alternative build ups for the first three tables above involve merely suitably wiring the relays which bring about the building up operations and properly wiring the selecting out relays for final result computing.

With the present construction it is possible to set up the cycle controller direct from the record both for regular multiplying operations and for rate card operations and to dispense with intervening retaining relay devices such as have been provided heretofore in machines of the type shown in U. S. application to Bryce and Dickinson, Serial No. 132,702, because for both types of operations in the present machine it is unnecessary to retain the factor entry going into MP for more than one card cycle. Accordingly, with the present construction the record itself, either regular record or detail record, can be used directly as a controlling means controlling the setup of the cycle controller. Simplicity of construction is thereby afforded over prior constructions. The cycle controller relay arrangement itself is fully described in Daly Patent No. 2,045,537, but the control for setting up the Y relays is direct from the record with the present construction, instead of through the MPRO readout as in the Daly patent.

What we claim is:

1. A calculating unit for a multiplying machine comprising a factor multiple pre-computing and result receiving device having plural means from which any one of all of the digital multiples of one factor may be directly read out, accumulating means having denominational order elements which control the setting of said plural means in accordance with amounts based on such factor, said last named accumulating means also accumulating a final result, and means controlled by said plural means for causing accumulation of the result in said accumulating means.

2. A calculating unit for a multiplying machine comprising a series of readout means from which any one of all the different digital multiples of one factor may be directly read out, accumulating means having denominational order elements which control the setting of the aforesaid means in accordance with amounts based upon such factor, a cyclically operable means, means controlled by said cyclically operable means for initially connecting all of said readout means with said denominational order elements and for thereafter disconnecting each readout means from said denominational order elements and means for causing entries based on said factor in said denominational orders while said readouts are connected thereto whereby said readout means are positioned to represent the various digital multiples of one factor.

3. A cyclically operable accounting machine including an accumulating type of entry receiving means having denominational order elements, a plurality of readout means all initially connected to said denominational order elements so as to be positioned thereby upon entry operations of said receiving means, means for causing entries in said receiving means while said readout means are connected therewith, connecting and disconnecting means for initially connecting all readouts and for disconnecting said readouts in succession and in successive machine cycles, and power means for actuating said last named means.

4. An accounting machine having an accumulative type of entry receiving means, a plurality of readout means all initially connected thereto so as to be positioned thereby and disconnectible therefrom after being positioned thereby, means to cause initial connection and successive disconnection of the different readout means, means under the control of a readout means disconnected from the receiving means for controlling an entry in the receiving means, and means for causing such entry.

5. In a multiplying machine with amount manifesting means for a multiplier factor, plural order entry receiving means for receiving the multiplicand and multiples thereof and for accumulating the final product, a plurality of readout means cooperating with the several digital orders of said receiving means and positioned thereby to render available the various digital multiples of the multiplicand, cyclically operable means for initially connecting all of said readout means with said entry receiving means and for disconnecting them in succession, means for effecting entries of the multiplicand and multiples thereof in plural orders of said receiving means while the readout means are connected therewith, means for resetting said receiving means after said readouts are disconnected therefrom, and means controlled by said multiplier factor manifesting means for selectively determining entries from said disconnected readout means into said entry receiving means, and means for effecting the determined entries whereby a final product is accumulated in said entry receiving means.

6. In a machine according to claim 5, a supplemental readout means positioned by said receiving means for representing a final product, means for connecting and disconnecting said supplemental readout means and said receiving means, and means for resetting said supplemental readout means while it is disconnected from said receiving means.

7. In a machine according to claim 5, a supplemental readout means positioned by said receiving means for representing a final product, means for connecting and disconnecting said supplemental readout means and said receiving means, and means for causing said resetting means to reset said receiving means after final product accumulation and while said supplemental readout means is disconnected therefrom, whereby the final product may remain available for readout on said supplemental readout means after reset of said receiving means.

8. Apparatus of the class described, comprising an entry receiving accumulator, a plurality of electrical readout means with settable elements which are all initially connected to said accumulator so as to be positioned thereby upon operation of said accumulator, means to effect a first entry in said accumulator to thereby set the settable elements of all readouts, one of said readout means controlling a further entry into the accumulator which positions it, and means to disconnect said last readout means from its positioning accumulator before such readout means controls the further entry into the accumulator.

9. A cyclically operable calculating apparatus including entry receiving accumulating means having plural denominational order elements, a plurality of readout means from which the different digital multiplicand multiples may be directly read out, means to enter a multiplicand in said accumulating means while all readout means are connected thereto so as to be actuated by the denominational order elements of said accumulating means, means for successively disconnecting certain readout means from the denominational order setting elements while other readout means are maintained connected to the denominational order elements in successive machine cycles, means to repeatedly control the accumulating means from said certain readout means which have become set and disconnected to provide for the building up of further multiples upon the readout means which are maintained connected, means for disconnecting said last readout means from the accumulator elements to prepare all of the readout means for final result computing, means to clear the accumulator preparatory to final result computing, means set up with a multiplier entry, and means controlled by said last named means to selectively direct entries from selected readout means into said accumulator for accumulating final results therein.

10. Control means for a calculating machine comprising a cyclically operable means, accumulating means receiving original and supplemental entries, a plurality of accumulator driven readout means from which multiples of a factor may be directly readout, means initially connecting all of said readout means with said accumulating means and for dis-connecting various of said readout means from the accumulating means under control of said cyclically operable means upon varying accumulation of amounts in said accumulating means, said amounts comprising multiples of an entered multiplicand whereby different ones of said readouts may become set so that different multiples of the multiplicand can be read out therefrom.

11. The invention according to claim 10 wherein means is provided affording a source of original entry for one factor and disconnected readout means comprise control means for controlling the entry of a supplemental amount into the positioning accumulating means.

12. A multiplying machine including multiplying means with a cycle controller therefor including a plurality of relays for directly controlling column shift and for eliminating multiplying cycles, record sensing means for concurrently sensing like index points in various columns of a record presented thereto, circuits directly connecting the said record sensing means to the relays for directly energizing said cycle control relays and setting up the cycle controller directly from a record and cooperating impulse timing means for said circuits to cause the relays related to various columns of the record where zeros appear to be directly energized through record perforations only upon zero positions of the record index points.

13. A multiplying machine of the type wherein multiplication is effected by accumulating selected pre-computed multiples of one factor, which multiples are selected according to the digits of the other factor including in combination, means for pre-computing and building up multiples of one factor, said pre-computing means including means for supplying representations of the built up multiples and an accumulator having plural denominational order elements connected to said supplying means for setting the latter, means for disconnecting said supplying means from said accumulator elements, means for resetting said accumulator elements after the supplying means are disconnected therefrom, and means for directing pre-computed multiples from the disconnected supplying means to the accumulator for final result computing whereby common plural elements of the accumulator may be utilized for multiples pre-computing and final result computing.

14. A rate card controlled multiplying machine with means for handling rate and detail cards, pre-sensing means to sense identifying characteristics on rate and detail cards and detect which kind of card is sensed, amount sensing means for sensing amounts on such cards multiple pre-computing means including readout means for rendering available all of the different digital multiples of one factor, means effective under control of the pre-sensing means to cause multiples to be built up by said pre-computing means and rendered available on the readout means, said multiples being based upon the factor derived by the amount sensing means from the rate card, said amount sensing means controlling the initial entry of the amount into the pre-computing means from said rate card, manifesting means for the other factor, means effective upon passage of detail cards through the amount sensing means to cause such factor to be manifested on said manifesting means, a result receiving means, and means effective upon passage of detail cards to cause entries into the result receiving means under the conjoint control of the manifesting means and the multiple readout means.

15. A multiplying machine including means to sense amounts on records, means to pre-sense the records for identifying characteristics thereon to detect whether a sensed record is a rate record or a detail record, factor multiple pre-computing means and readout means for all of the different digital multiples of one factor, means controlled by the aforesaid pre-sensing means to direct sensed amounts into said pre-computing means only from rate records, means to manifest the other factor, directing means also controlled by said pre-sensing means to direct amounts into said manifesting means only from detail records, the aforesaid multiple pre-computing means comprising an accumulative type receiving means, means for conditioning said last named means for result computing operations by clearing it and means for controlling final result computing under control of the readout means of the pre-computing means and under selective control of the manifesting means.

16. In a rate card controlled multiplying machine, means to sense amounts on rate and detail records, sensing means to distinguish rate and detail records according to distinguishing characteristics thereon, including in combination multiple pre-computing means receiving initially amounts sensed from rate records under the control of the distinguishing sensing means, said pre-computing means including settable readouts for rendering available all of the multiples of the factor read from the rate record, means to cause such multiples to be formed, means for manifesting the other factor controlled by the amount sensing means for such factor and under the control of the distinguishing sensing means, said pre-computing means including accumulative type of receiving means for setting the readout means which receiving means is adapted to receive amounts from rate records and also adapted to receive final results, means to clear said receiving means to condition it for final result receiving operations, means to cause final result receiving operations, means to control such operations selectively under the conjoint control of the factor manifesting means and under control of readout means which are selected by said manifesting means, means to cause reset of the factor manifesting means prior to final result receiving operations, said means being under the control of the distinguishing sensing means when it detects a rate record and means to bring about reset of the readout means, said means being under control of the distinguishing sensing means upon the latter detecting a new rate record.

17. A machine according to claim 15, wherein the final result computing operations of the machine comprise a plurality of multiplying cycles in which selected pre-computed multiples are entered into the accumulative type receiving means and wherein resetting means are provided for the manifesting means for the other factor and including control means for such resetting means to bring about reset of the factor manifesting means for the other factor during the last multiplying cycle of the plurality of cycles, and means controlled by the sensing means which pre-senses the records to cause operation of said control means upon the sensing of a detail record whereby operating time of the machine may be saved for each detail record upon rate card operations.

JAMES W. BRYCE.
ARTHUR H. DICKINSON.

CERTIFICATE OF CORRECTION.

Patent No. 2,219,737.                              October 29, 1940.

JAMES W. BRYCE, ET AL.

It is hereby certified that error appears in the printed specification of the above numbered patent requiring correction as follows: Page 2, first column, line 43, for "steup" read --setup--; page 7, second column, line 60, for the word "positions" read --position--; page 8, first column, line 66, for "mite" read --time--; page 9, first column, line 4-5, strike out the syllable and words "multi- Yh and Yth energized, the Yh—2 contacts and" and insert instead --multiplier Yth and Yh will become energized. With--; page 9, first column, line 26, for "Mp" read --MP--; page 10, first column, line 16, after "is" insert --a--; page 11, second column, line 59, for "(Fig. 10)" read --(Fig. 10e)--; and that the said Letters Patent should be read with this correction therein that the same may conform to the record of the case in the Patent Office.

Signed and sealed this 17th day of December, A. D. 1940.

Henry Van Arsdale,
(Seal)                              Acting Commissioner of Patents.